United States Patent
Moore et al.

(10) Patent No.: US 7,965,299 B2
(45) Date of Patent: Jun. 21, 2011

(54) IMPLEMENTING COMPOSITING OPERATIONS ON IMAGES

(75) Inventors: Kevin John Moore, North Ryde (AU); Craig William Northway, Gladesville (AU); Alexander Vincent Danilo, Harbord (AU)

(73) Assignee: Canon Kabushiki Kaisha, Tokyo (JP)

(*) Notice: Subject to any disclaimer, the term of this patent is extended or adjusted under 35 U.S.C. 154(b) by 316 days.

(21) Appl. No.: 11/551,389

(22) Filed: Oct. 20, 2006

(65) Prior Publication Data

US 2007/0126753 A1 Jun. 7, 2007

(30) Foreign Application Priority Data

Oct. 31, 2005 (AU) ............................ 2005229627
Oct. 31, 2005 (AU) ............................ 2005229629

(51) Int. Cl.
G09G 5/02 (2006.01)
(52) U.S. Cl. ........................ 345/592; 345/589
(58) Field of Classification Search ............ 345/589, 345/592, 619, 629

See application file for complete search history.

(56) References Cited

U.S. PATENT DOCUMENTS

| | | | |
|---|---|---|---|
| 5,745,121 A * | 4/1998 | Politis | 345/619 |
| 6,028,583 A | 2/2000 | Hamburg | |
| 6,184,891 B1 * | 2/2001 | Blinn | 345/426 |
| 6,185,342 B1 | 2/2001 | Hamburg et al. | |
| 6,421,460 B1 * | 7/2002 | Hamburg | 382/162 |
| 6,480,201 B1 * | 11/2002 | Fushiki et al. | 345/592 |
| 6,483,519 B1 * | 11/2002 | Long et al. | 345/619 |
| 6,828,985 B1 * | 12/2004 | Long et al. | 345/620 |
| 6,961,067 B2 | 11/2005 | Moore | 345/589 |
| 6,970,169 B1 * | 11/2005 | Harris | 345/582 |
| 7,046,253 B2 * | 5/2006 | Long et al. | 345/591 |
| 7,167,184 B2 * | 1/2007 | Graham | 345/592 |
| 7,184,055 B2 * | 2/2007 | Hamburg | 345/592 |
| 7,277,102 B2 * | 10/2007 | Moore | 345/629 |
| 7,483,036 B2 * | 1/2009 | Moore | 345/589 |
| 2002/0015039 A1 | 2/2002 | Moore | 345/421 |
| 2003/0016221 A1 * | 1/2003 | Long et al. | 345/441 |
| 2003/0179200 A1 * | 9/2003 | Martin et al. | 345/428 |
| 2003/0193508 A1 * | 10/2003 | Graham | 345/581 |
| 2004/0085559 A1 | 5/2004 | Danilo | 358/1.12 |
| 2004/0189656 A1 * | 9/2004 | Moore | 345/589 |
| 2005/0195220 A1 * | 9/2005 | Northway et al. | 345/620 |
| 2006/0114263 A1 * | 6/2006 | Moore | 345/592 |
| 2006/0187235 A1 * | 8/2006 | Hamburg | 345/592 |
| 2007/0126753 A1 | 6/2007 | Moore et al. | 345/592 |

OTHER PUBLICATIONS

Thomas Porter, et al., "Compositing Digital Images", Computer Graphics, vol. 18 No. 3 (1984) pp. 253-259.
"Overview of Transparency", pp. 474-480 (http://partners.adobe.com/public/developers/en/pdf/PDFReference15v6.pdf).
"10 Rendering Model", SVG 1.2, pp. 1-27 (Oct. 27, 2004). (http://www.w3.org/TR/2004/WD-SVG12-20041027/rendering.html).

* cited by examiner

*Primary Examiner* — Chante Harrison
(74) *Attorney, Agent, or Firm* — Fitzpatrick, Cella, Harper & Scinto

(57) ABSTRACT

In a method of compositing graphic elements in a pixel-based renderer, a first graphic element is received having a first color and a first opacity, and a second graphic element is received having a second color and a second opacity. A blend output is obtained from a blend function dependent on the first color and the second color, and a resultant color is determined of a compositing operation on the first and second graphic elements, with the resultant color being dependent on the blend output and otherwise being independent of the second color.

32 Claims, 25 Drawing Sheets

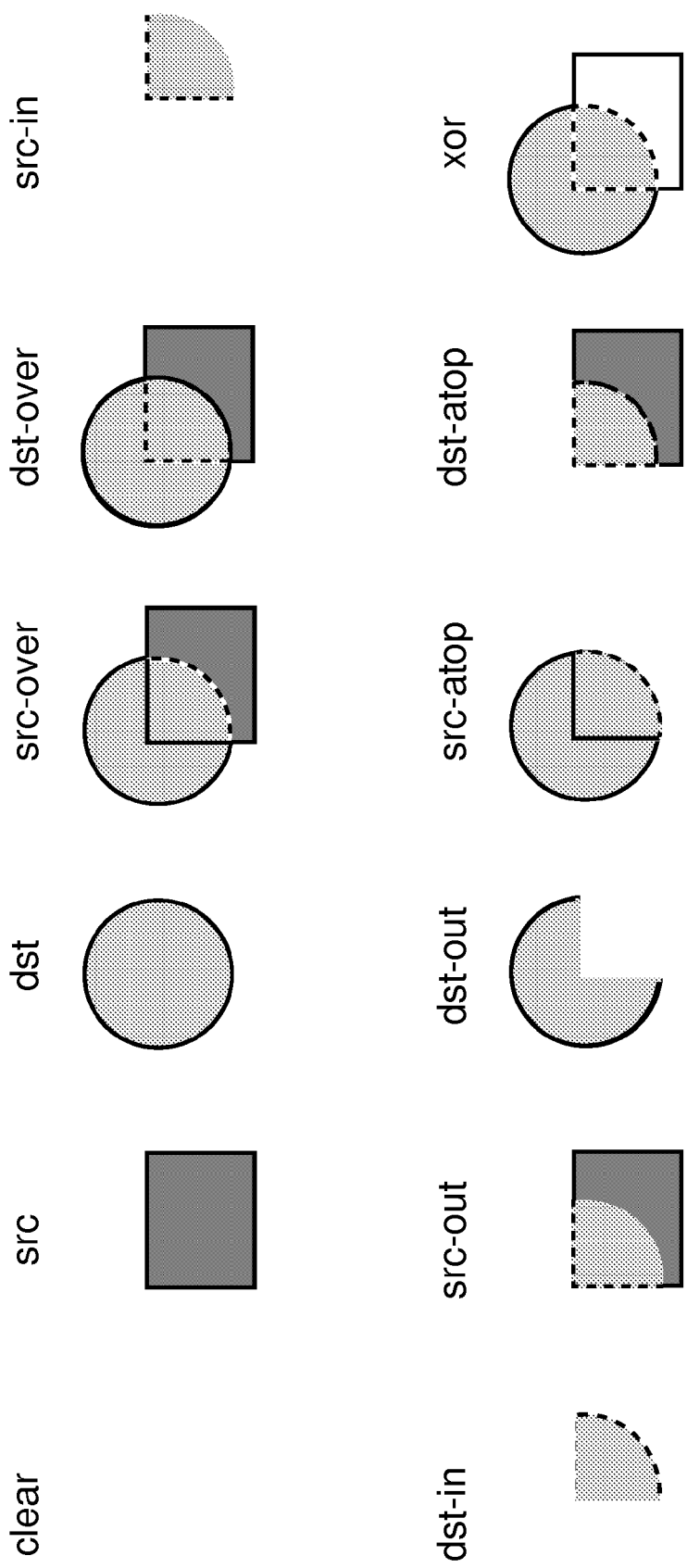

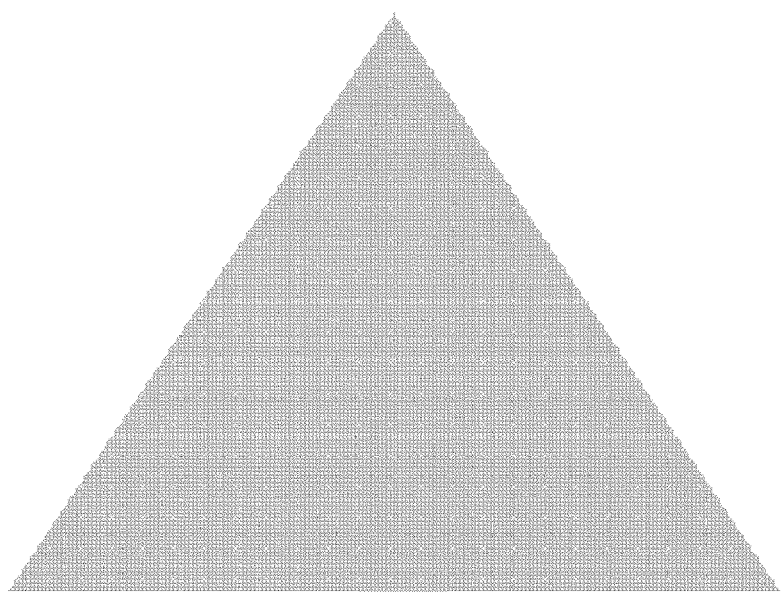
301
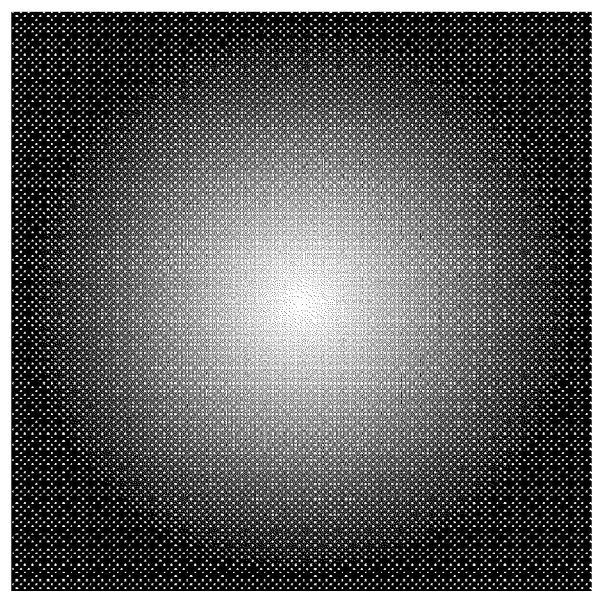
302
Prior Art
Fig. 3A

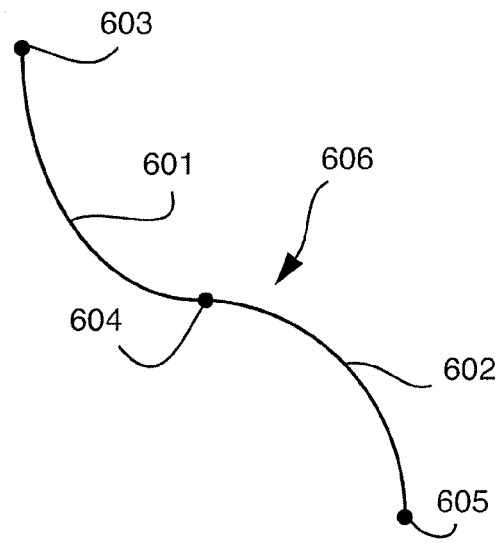
Fig. 7A
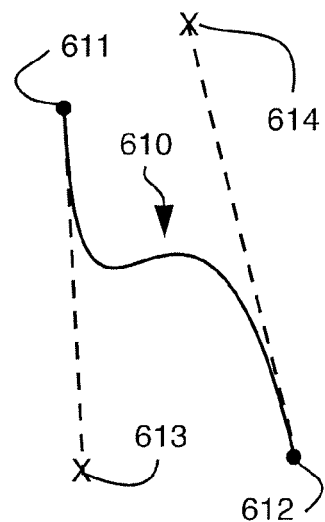
Fig. 7B
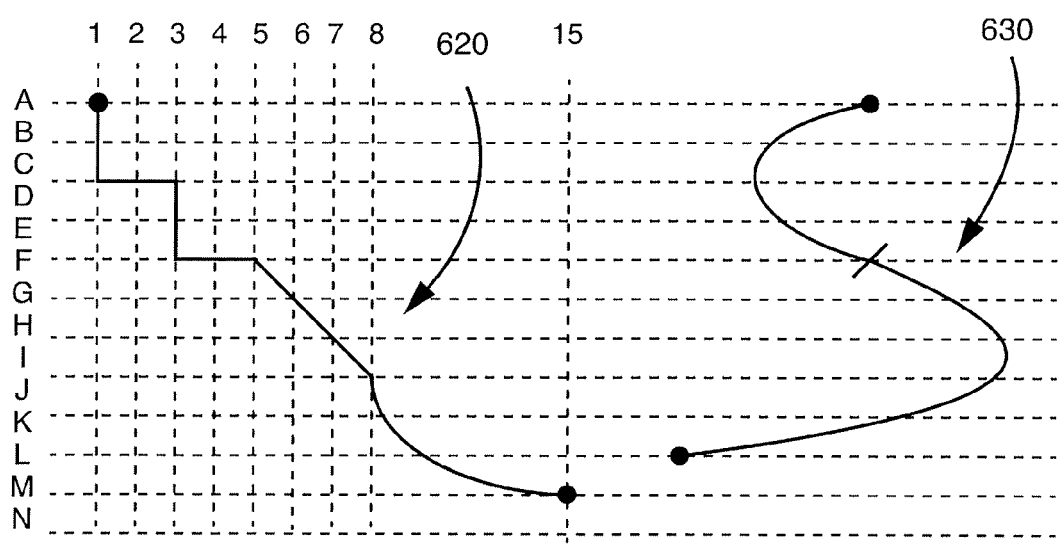
Fig. 7C
Fig. 7D

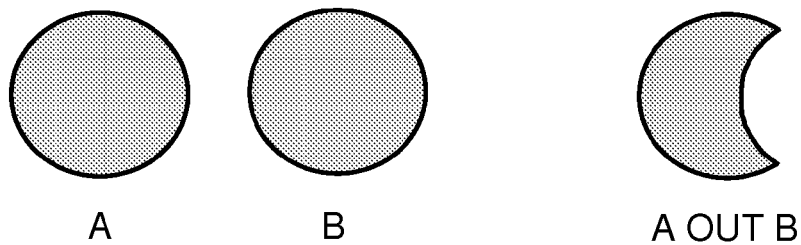
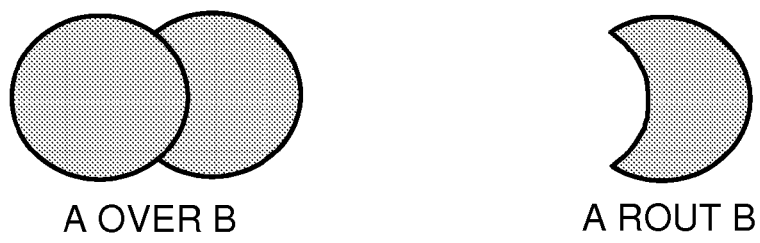
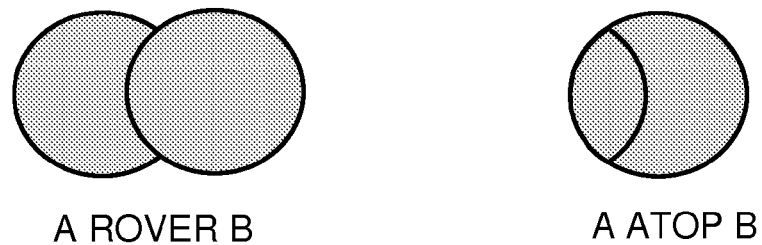
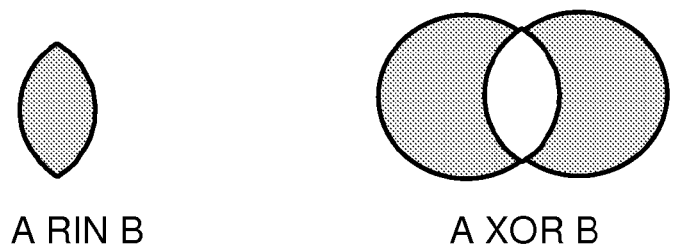
Fig. 11
Prior Art

Fig. 12

| Raster operation code | Operation | Operation Name |
|---|---|---|
| 0x00 | r = 0 | LCO_BLACK |
| 0x01 | r = src & dest | LCO_MASKPEN |
| 0x02 | r = src & ~dest | LCO_MASKPENNOT |
| 0x03 | r = src | LCO_COPYPEN |
| 0x04 | r = ~src & dest | LCO_MASKNOTPEN |
| 0x05 | r = dest | LCO_NOP |
| 0x06 | r = src ^ dest | LCO_XORPEN |
| 0x07 | r = src \| dest | LCO_MERGEPEN |
| 0x08 | r = ~(src \| dest) | LCO_NOTMERGEPEN |
| 0x09 | r = ~(src ^ dest) | LCO_NOTXORPEN |
| 0x0a | r = ~dest | LCO_NOT |
| 0x0b | r = src \| ~dest | LCO_MERGEPENNOT |
| 0x0c | r = ~src | LCO_NOTCOPYPEN |
| 0x0d | r = ~src \| dest | LCO_MERGENOTPEN |
| 0x0e | r = ~(src & dest) | LCO_NOTMASKPEN |
| 0x0f | r = 0xff | LCO_WHITE |
| 0x10 | r = min(src, dest) | LCO_MIN |
| 0x11 | r = max(src, dest) | LCO_MAX |
| 0x12 | r = clamp(src + dest) | LCO_PLUS |
| 0x13 | r = src | LCO_COPYPEN_PREMULTIPLIED |
| 0x14 | r = clamp(src - dest) | LCO_SRC_MINUS_DEST |
| 0x15 | r = dest | LCO_NOP_PREMULTIPLIED |
| 0x16 | r = clamp(dest - src) | LCO_DEST_MINUS_SRC |
| 0x17 | r = clamp(src + dest) where dest is signed | LCO_PLUS_SIGNED_DEST |
| 0x18 | r = threshold(dest, src) | LCO_THRESH_DEST_SRC |
| 0x19 | r = threshold(src, dest) | LCO_THRESH_SRC_DEST |
| 0x1a | r = ~dest | LCO_NOT_DATTR |
| 0x1b | o = luminance(dest; src) | LCO_LUMINANCE |
| 0x1c | r = ~src | LCO_NOTCOPYPEN_SATTR |
| 0x1d | o = ckey(dest; src+/-o) | LCO_CKEY |

| Operator | COLOR_OP | ALPHA_OP Flags Set | Diagram |
|---|---|---|---|
| clear | not used | none | |
| src | LCO_COPYPEN | LAO_USE_S_ROP_D<br>LAO_USE_S_OUT_D | |
| dest | LCO_NOP | LAO_USE_S_ROP_D<br>LAO_USE_D_OUT_S | |
| src over dest | LCO_COPYPEN | LAO_USE_S_ROP_D<br>LAO_USE_S_OUT_D<br>LAO_USE_D_OUT_S | |
| src rover dest<br>(dest over src) | LCO_NOP | LAO_USE_S_ROP_D<br>LAO_USE_S_OUT_D<br>LAO_USE_D_OUT_S | |
| src in dest | LCO_COPYPEN | LAO_USE_S_ROP_D | |
| src rin dest<br>(dest in src) | LCO_NOP | LAO_USE_S_ROP_D | |
| src out dest | not used | LAO_USE_S_OUT_D | |

Fig. 13A

| Operator | COLOR_OP | ALPHA_OP Flags Set | Diagram |
|---|---|---|---|
| src rout dest (dest out src) | not used | LAO_USE_D_OUT_S | 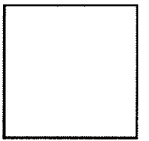 |
| src atop dest | LCO_COPYPEN | LAO_USE_S_ROP_D<br>LAO_USE_D_OUT_S |  |
| src ratop dest (dest atop src) | LCO_NOP | LAO_USE_S_ROP_D<br>LAO_USE_S_OUT_D |  |
| src xor dest | not used | LAO_USE_S_OUT_D<br>LAO_USE_D_OUT_S | 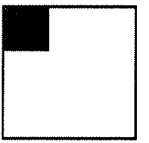 |
Fig. 13B

IMPLEMENTING COMPOSITING OPERATIONS ON IMAGES

FIELD OF INVENTION

The present invention relates to display and printing of graphic objects and in particular to the modification of displayed graphic objects using blend operations.

BACKGROUND

The display and printing of images by computer systems often involves some manipulation of the images, for example through combining the images using compositing operations or by modification using blend, or blending, operations. Other manipulations such as colour mapping may also be performed.

In compositing, graphic objects with transparency data may be combined using operators such as the well-known Porter and Duff operators (described in "Compositing Digital Images", Porter, T, Duff, T; Computer Graphics, Vol 18 No 3 (1984) pp 253-259), in which the opacity is modelled as the proportion of a pixel that is covered by opaque data. When combining colour and opacity from two Objects A and B (Source and Destination objects respectively), the pixel is divided into four regions, as illustrated in FIG. 1:

a region 10 where both objects are opaque, of area $\alpha_A \alpha_B$ [Source and Destination objects];

a region 20 where only Object A is opaque, of area $\alpha_A(1-\alpha_B)$ [Source object Only];

a region 30 where only Object B is opaque, of area $\alpha_B(1-\alpha_A)$ [Destination object Only]; and a region 40 where both objects are transparent, of area $(1-\alpha_A)(1-\alpha_B)$ [No Source or Destination object], where:

$\alpha_A$=opacity (or "alpha") of Object A $\alpha_B$=opacity of Object B

The mathematical descriptions of these regions are used to define twelve compositing operators. All operators provide distinct combinations of these regions. Examples of the Porter and Duff operators applied to opaque objects are illustrated in FIG. 2A, and examples of the Porter and Duff operators applied to partially transparent objects are illustrated in FIG. 2B.

Porter and Duff operators can be summarised by three terms within a function that represent the three regions 10, 20, 30 that may be painted by any of the operators. The fourth region 40 where no source (Object A) or destination (Object B) colour is present cannot contribute to the resultant colour or opacity. The resultant colour multiplied by the resultant opacity at any pixel is given by:

$$C_{result}\alpha_{result}=F(C_A,C_B)\alpha_A\alpha_B+Y \cdot C_A\alpha_A(1-\alpha_B)+Z \cdot C_B\alpha_B(1-\alpha_A) \quad (1)$$

where:

$F(C_A, C_B)\alpha_A\alpha_B$=a function selecting either the source or destination colour or no colour, multiplied by the product of the source and destination alpha. Hence this term can only be one of the following; $C_A\alpha_A\alpha_B$, $C_B\alpha_A\alpha_B$ or 0. This term represents the [Source and Destination] region 10 in FIG. 1.

$Y \cdot C_A\alpha_A(1-\alpha_B)$=the product of the source colour, source opacity or alpha, complement of the destination opacity, and a binary factor (Y; either 1 or 0). This term represents the [Source Only] region 20 in FIG. 1.

$Z \cdot C_B\alpha_B(1-\alpha_A)$=the product of the destination colour, destination alpha, complement of the source opacity, and a binary factor (Z; either 1 or 0). This term represents the [Destination Only] region 30 in FIG. 1.

The resultant opacity at any point is given by:

$$\alpha_{result}=X \cdot \alpha_A\alpha_B+Y \cdot \alpha_A(1-\alpha_B)+Z \cdot \alpha_B(1-\alpha_A) \quad (2)$$

where:

$X \cdot \alpha_A\alpha_B$=the product of the source opacity, destination opacity, and a binary factor (X; either 1 or 0). This term represents the [Source and Destination] region 10 in FIG. 1.

$Y \cdot \alpha_A(1-\alpha_B)$=the product of the source opacity, complement of the destination opacity, and the binary factor Y (either 1 or 0). This term represents the [Source Only] region 20 in FIG. 1.

$Z \cdot \alpha_B(1-\alpha_A)$=the product of the destination opacity, complement of the source opacity, and the binary factor Z (either 1 or 0). This term represents the [Destination Only] region 30 in FIG. 1.

Table 1 lists the 12 Porter and Duff operators. A textual description is provided explaining how the operators relate to the equations and terms defined above.

TABLE 1

The twelve Porter and Duff operators

| Operator | $C_{result}\alpha_{result}$ | $\alpha_{result}$ | $F(C_A, C_B)$ | X | Y | Z | Description |
|---|---|---|---|---|---|---|---|
| clear | 0 | 0 | 0 | 0 | 0 | 0 | None of the terms are used. |
| src | $C_A\alpha_A$ | $\alpha_A$ | $C_A$ | 1 | 1 | 0 | Only the terms that contribute source colour are used. |
| dst | $C_B\alpha_B$ | $\alpha_B$ | $C_B$ | 1 | 0 | 1 | Only the terms that contribute destination colour are used. |
| src-over | $C_A\alpha_A + C_B\alpha_B(1-\alpha_A)$ | $\alpha_A + \alpha_B(1-\alpha_A)$ | $C_A$ | 1 | 1 | 1 | The source colour is placed over the destination colour. |
| dst-over | $C_B\alpha_B + C_A\alpha_A(1-\alpha_B)$ | $\alpha_B + \alpha_A(1-\alpha_B)$ | $C_B$ | 1 | 1 | 1 | The destination colour is placed over the source colour. |
| src-in | $C_A\alpha_A\alpha_B$ | $\alpha_A\alpha_B$ | $C_A$ | 1 | 0 | 0 | The source that overlaps the destination, replaces the destination. |

TABLE 1-continued

The twelve Porter and Duff operators

| Operator | $C_{result} \alpha_{result}$ | $\alpha_{result}$ | $F(C_A, C_B)$ | X | Y | Z | Description |
|---|---|---|---|---|---|---|---|
| dst-in | $C_B \alpha_A \alpha_B$ | $\alpha_A \alpha_B$ | $C_B$ | 1 | 0 | 0 | The destination that overlaps the source, replaces the source. |
| src-out | $C_A \alpha_A (1 - \alpha_B)$ | $\alpha_A (1 - \alpha_B)$ | 0 | 0 | 1 | 0 | The source that does not overlap the destination replaces the destination. |
| dst-out | $C_B \alpha_B (1 - \alpha_A)$ | $\alpha_B (1 - \alpha_A)$ | 0 | 0 | 0 | 1 | The destination that does not overlap the source replaces the source. |
| src-atop | $C_A \alpha_A \alpha_B + C_B \alpha_B (1 - \alpha_A)$ | $\alpha_B$ | $C_A$ | 1 | 0 | 1 | The source that overlaps the destination is composited with the destination. |
| dst-atop | $C_B \alpha_A \alpha_B + C_A \alpha_A (1 - \alpha_B)$ | $\alpha_A$ | $C_B$ | 1 | 1 | 0 | The destination that overlaps the source is composited with the source and replaces the destination. |
| xor | $C_A \alpha_A (1 - \alpha_B) + C_B \alpha_B (1 - \alpha_A)$ | $\alpha_A + \alpha_B - 2\alpha_A \alpha_B$ | 0 | 0 | 1 | 1 | The non-overlapping regions of source and destination are combined. |

It is common, however, only to use the src-over operator, where all three contributing regions 10, 20, 30 are used, and the colour of the region 10 where both objects are opaque is taken from the colour of the topmost (or source) object.

The src-over operator has also been used as the basis for blend, or blending, operations in systems where transparency data is used. In a blend operation, the source or blending object (Object A) or effect is used as a parameter of a blend function B that modifies the destination object (Object B). In the presence of transparency, the blend function operates on the region 10 where both objects are opaque, so that the src-over operator gives rise to an over-based blend operation:

$$C_{over-blend} \alpha_{over-blend} = C_A \alpha_A (1-\alpha_B) + C_B \alpha_B (1-\alpha_A) + B(C_A, C_B) \alpha_A \alpha_B \quad (3)$$

$$\alpha_{over-blend} = \alpha_A (1-\alpha_B) + \alpha_B (1-\alpha_A) + \alpha_A \alpha_B \quad (4)$$

where:
$C_A$=colour of Object A;
$C_B$=colour of Object B;
$C_{over-blend}$=resultant colour of over-based blend operation;
$B(C_A, C_B)$=blend function of Objects A and B;
$\alpha_A$=opacity of Object A;
$\alpha_B$=opacity of Object B; and
$\alpha_{over-blend}$=resultant opacity of over-based blend operation.

The src-over operator has the useful property that it does not modify pixels of the bottom object (Object B) outside the intersection of the two objects. However, a blend operation based on the src-over operator contains terms that include colour from both operands of the blending function. In some cases the resultant produced by an over-based blend operation may be undesirable. An example of such a case is described in the following three paragraphs.

When Object B is partially transparent i.e. $\alpha_B < 1$, the colour of Object A contributes to the colour of the resultant other than through the blending function. FIG. 3A shows a partially transparent object 301 (Object B) and a blending object 302 (Object A). FIG. 3B shows the result 303 of blending the partially transparent object 301 (Object B) with the blending object 302 (Object A) using the over-based blending operation. In the example, the partially transparent object 301 (Object B) is a partially-transparent grey triangle. The blending object 302 (Object A) is a black square containing a circular region in which the colour varies radially from a black circumference to a white centre. In this particular case the blending operation uses a 'dodge' function. The 'dodge' function is described by the $B(C_A, C_B)$ term in the over-based blend operation:

if $(C_A + C_B) >= 1$ $$B(C_A, C_B) = 1 \quad (5)$$

else $$B(C_A, C_B) = C_B \cdot 1(1-C_A) \quad (6)$$

It is noted that $C_A$ and $C_B$ are normalised colour values in range [0, 1]. If $C_A$ has a value of 1, no matter what value $C_B$ has, the term of $B(C_A, C_B)$ will be equal to 1.

The objects, 301 and 302, are shown separately in FIG. 3A and the result 303 of using objects 301, 302 in an over-based blend operation is shown in FIG. 3B. Notice the black colour of Object A 302 darkening the destination colour in the overlapping area 310 of the two objects.

This effect is particularly noticeable in the 'dodge' and 'burn' blending operations. The 'dodge' operator is intended to brighten the destination (Object B) colour to reflect the source (Object A) colour. Performing a 'dodge' operation with black is intended to produce no change. The 'burn' operator is intended to be complementary, and darken the destination colour to reflect the source colour. Performing a 'burn' operation with white is intended to produce no change.

There exists a need to be able to modify the result of a blend operation in order to produce an alternative effect.

SUMMARY OF THE INVENTION

A rendering system, which may be a framestore renderer, a bandstore renderer or a pixel sequential renderer, is provided with blending operations based on the Porter and Duff atop operator and the Porter and Duff in operator. These blending operations include colour from both operands in the result of the blend operation, but only through the term incorporating the blend function.

According to a first embodiment of the invention there is provided a method of compositing graphic elements in a pixel-based renderer, said method comprising the steps of:

receiving a first graphic element having a first colour and a first opacity and a second graphic element having a second colour and a second opacity;

determining a blend output of a blend function dependent on the first colour and the second colour; and determining a resultant colour of a compositing operation on the first and second graphic elements, the resultant colour being dependent on the blend output and otherwise being independent of the second colour.

According to a second aspect of the invention there is provided a method of compositing a first graphic element comprising a first colour and a first opacity with a second graphic element comprising a second colour and a second opacity using a blend function that operates on the two colours independently of their respective opacities and a compositing operator characterised in that the contribution of the second graphic element colour to the resultant colour is independent of the first opacity of the first graphic element.

According to a further aspect of the invention there is provided an apparatus for compositing graphic elements in a pixel-based renderer, said apparatus comprising:

means for receiving a first graphic element having a first colour and a first opacity and a second graphic element having a second colour and a second opacity;

means for determining a blend output of a blend function dependent on the first colour and the second colour; and means for determining a resultant colour of a compositing operation on the first and second graphic elements, the resultant colour being dependent on the blend output and otherwise being independent of the second colour.

According to a further aspect of the invention there is provided a computer program product comprising machine-readable program code recorded on a machine-readable recording medium, for controlling the operation of a data processing apparatus on which the program code executes to perform a method of compositing graphic elements in a pixel-based renderer, said method comprising the steps of:

receiving a first graphic element having a first colour and a first opacity and a second graphic element having a second colour and a second opacity;

determining a blend output of a blend function dependent on the first colour and the second colour; and determining a resultant colour of a compositing operation on the first and second graphic elements, the resultant colour being dependent on the blend output and otherwise being independent of the second colour.

According to a further aspect of the invention there is provided a computer program comprising machine-readable program code for controlling the operation of a data processing apparatus on which the program code executes to perform a method of compositing graphic elements in a pixel-based renderer, said method comprising the steps of:

receiving a first graphic element having a first colour and a first opacity and a second graphic element having a second colour and a second opacity;

determining a blend output of a blend function dependent on the first colour and the second colour; and determining a resultant colour of a compositing operation on the first and second graphic elements, the resultant colour being dependent on the blend output and otherwise being independent of the second colour.

Other aspects of the invention are also disclosed.

BRIEF DESCRIPTION OF THE DRAWINGS

One or more embodiments of the invention will now be discussed with reference to the drawings, in which:

FIG. 2B shows Porter and Duff operators used to composite partially transparent objects;

FIG. 3A shows two objects used to illustrate different blending operations;

FIGS. 7A to 7D provide a comparison between edge description formats;

FIG. 11 depicts the result of a number of compositing operations;

FIG. 12 shows a table of a number of raster operations;

FIGS. 13A and 13B show a table of the principal compositing operations and their corresponding raster operations and opacity flags;

DETAILED DESCRIPTION

Figure 1:
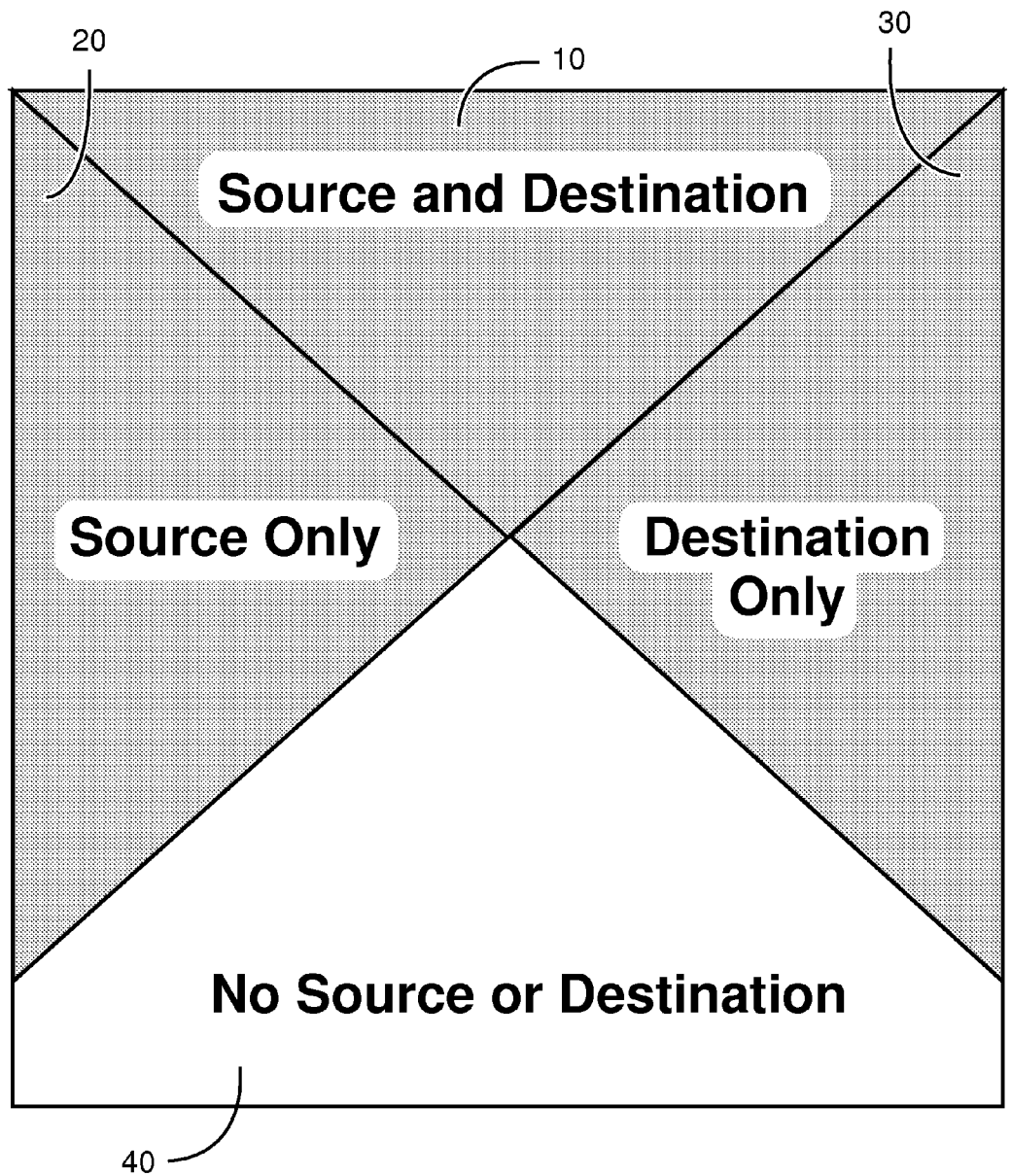
FIG. 1 shows sub-pixel regions used to describe the Porter and Duff operators.
Figure 2A:
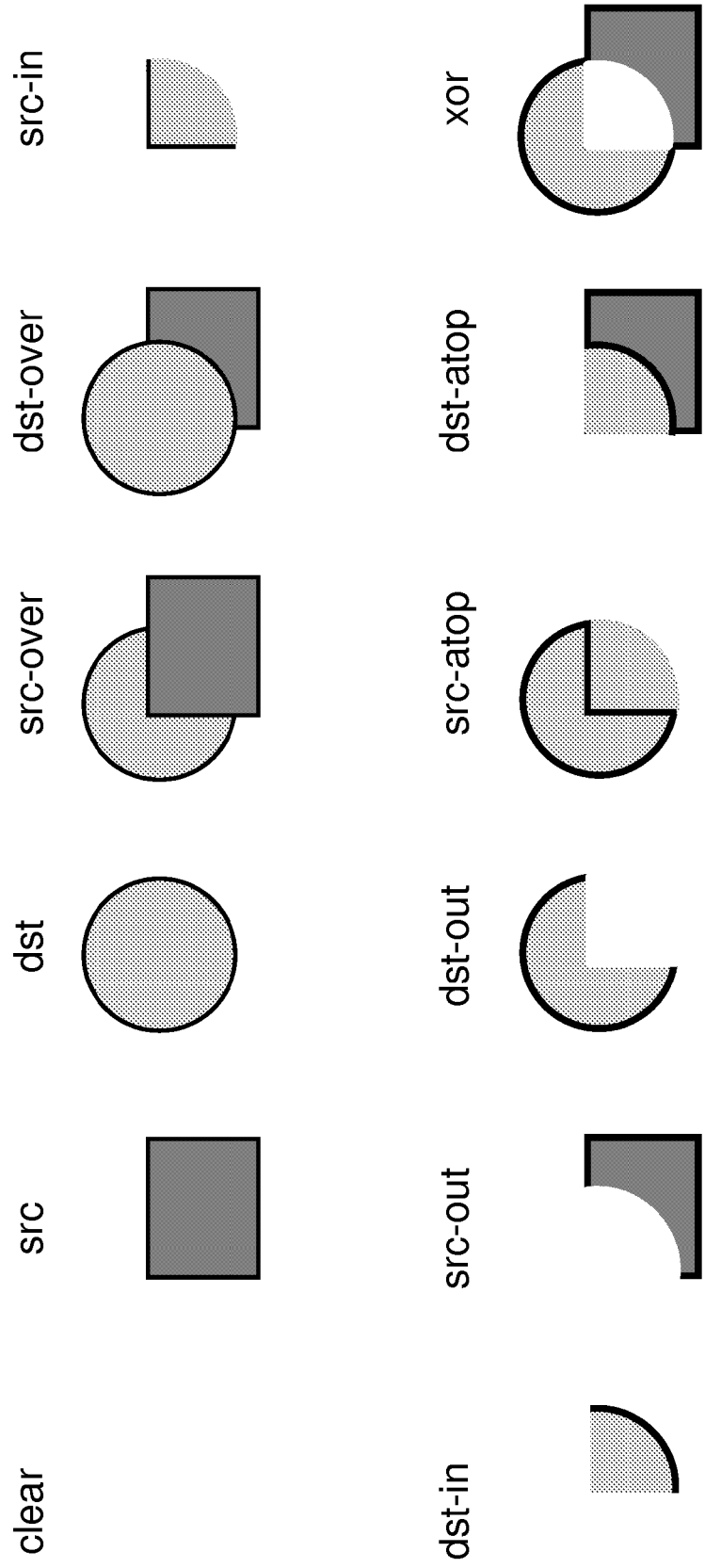
FIG. 2A shows Porter and Duff operators used to composite opaque objects.

Where reference is made in any one or more of the accompanying drawings to steps and/or features, which have the same reference numerals, those steps and/or features have for the purposes of this description the same function(s) or operation(s), unless the contrary intention appears.

A rendering system is provided with operations for compositing based on the Porter and Duff model as described in "Compositing Digital Images", Porter, T: Duff, T; Computer Graphics, Vol 18 No 3 (1984) pp 253-259, with the addition of blending operations. In the Porter and Duff model, a pixel in an object is notionally divided into two regions, one fully opaque and one fully transparent, such that the proportion of the pixel that is opaque is given by the opacity, a (or so in the notation of FIG. 4A).

Figure 4A:
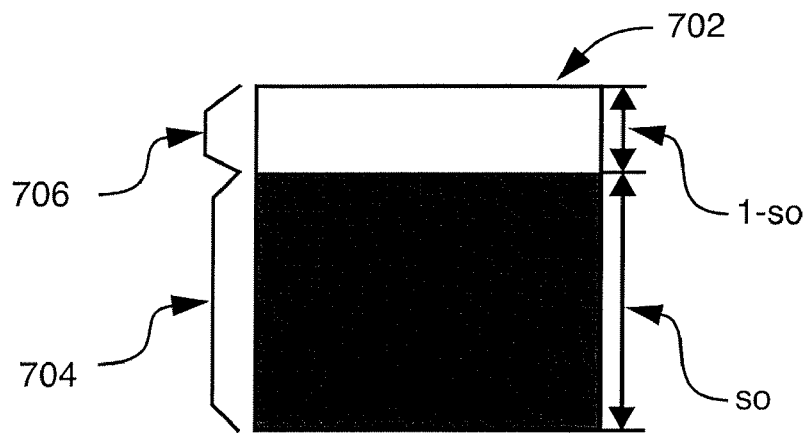
FIGS. 4A to 4C illustrate pixel combinations between source and destination objects.
Figure 4B:
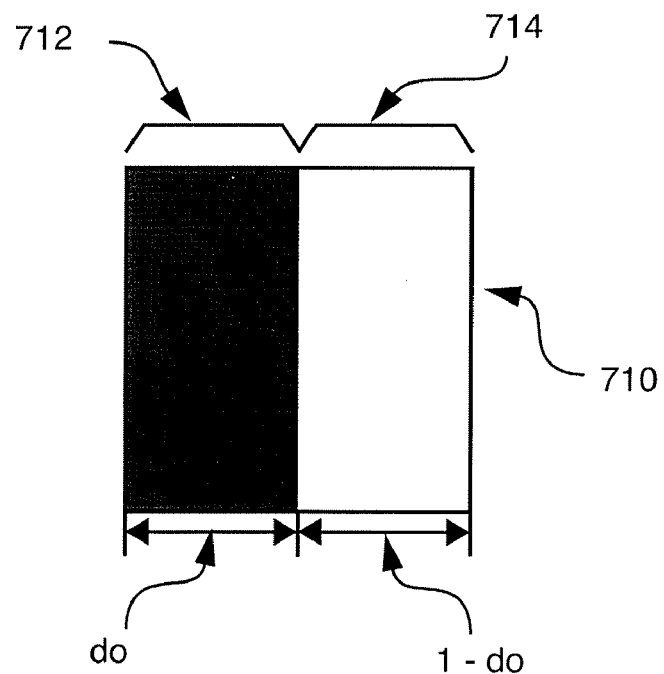
Figure 4C:
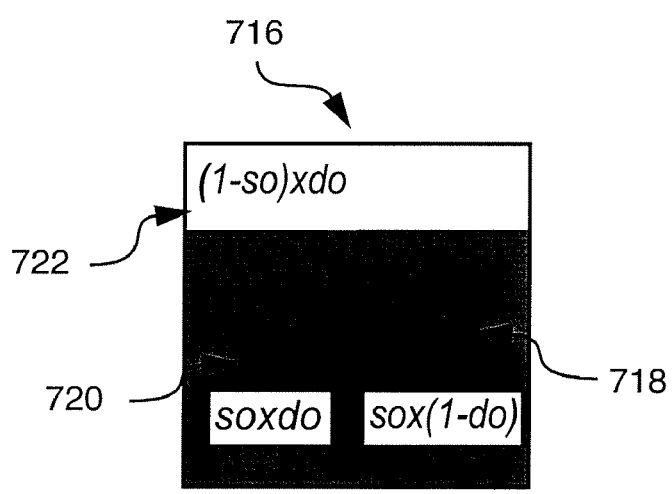

If two objects S and D overlap, their opacities act independently such that each pixel in the overlap region is divided into four regions, orthogonally, as shown in FIG. 4C. In the region 718 (S OUT D), only the S object is opaque and contributes colour. In the region 722 (D OUT S), only the D object is opaque and contributes colour. In the region 720 (S ROP D), both objects are opaque. In strict Porter and Duff, colour in the S ROP D region 720 is determined by the priority order of the objects. However, when the system caters for blending of colours, this region 720 takes the colour of the blend between the two objects according to the raster operation (op). The fourth region 716 is transparent, and therefore never contributes colour.

A set of flags controlling the contribution of the regions provides a flexible means of determining the Porter and Duff operation to be performed.

The Porter and Duff operators are formed by combining colour and opacity contributed by combinations of the aforementioned regions. The original Porter and Duff operators are formed from the complete set of combinations of these regions where the intersecting region S ROP D 720 takes the colour of the uppermost (higher priority) object.

In the described arrangements, a rendering system, which can be a framestore renderer, a bandstore renderer or a pixel sequential renderer, is provided with blend operations based on the Porter and Duff atop (ie. src-atop) operator. These operations are distinct from both their predecessors, i.e. the Porter and Duff operators and the prior art over (ie. src-over) based blend operations. Porter and Duff operators only allow inclusion or non-inclusion of colour and transparency values obtained directly from the objects. Objects to be rendered are often referred to as "graphic elements" in the art. The prior art blend operations explicitly include colour from both operands in the result of the blend.

The basic atop operator as defined by Porter and Duff is as follows:

$$\alpha_{result}C_{result}=(1-\alpha_A)\alpha_B C_B+\alpha_A\alpha_B C_A \quad (7)$$

In the first arrangement, the atop operator is modified such that the colour of the region where both objects are opaque is determined by the blending function, $B(C_A, C_B)$:

$$\alpha_{result}C_{result}=(1-\alpha_A)\alpha_B C_B+\alpha_A\alpha_B B(C_A,C_B) \quad (8)$$

$$\alpha_{result}\alpha_B \quad (9)$$

Like the over operator, the atop operator does not modify pixels of object B outside the intersection of the two objects. The atop operator is therefore suitable for use in a framestore system, as discussed in more detail below. Furthermore, the blend operation based on atop does not include a term in which object A directly contributes colour. The only effect of the colour of object A on the result is through the blending function. Note also that the resultant (non-premultiplied) colour is independent of the opacity of Object B.

A similar blend operation may be constructed by including the colour term from object A and not including that of object B, i.e. a blend operation based on the Porter and Duff ratop (ie. dst-atop) operator. However such an operator potentially modifies all of the pixels of object B, which makes it expensive to implement in a framestore system where object B has been stored in the framestore.

Blend operations may also be constructed based on the Porter and Duff in (ie. src-in) operator. The basic in operator as defined by Porter and Duff is as follows:

$$\alpha_{result}C_{result}=\alpha_A\alpha_B C_A \quad (10)$$

In the arrangements described herein, the in-based blend operation is:

$$\alpha_{result}C_{result}=\alpha_A\alpha_B B(C_A,C_B) \quad (11)$$

$$\alpha_{result}\alpha_A\alpha_B \quad (12)$$

The in operator has the undesirable property that it potentially modifies an object over the entire extent of the object. The in operator is therefore expensive to use in a framestore system. This expense is due to the modification of previously rendered objects by clearing the objects outside the area of intersection. However, blend operations based on the in operator are potentially useful operations and are included for completeness.

The remaining Porter and Duff operators do not include the region where both objects overlap and are therefore not suitable candidates for use with blending operations.

The blend functions B used in the described arrangements may be 'Dodge' or 'Burn' functions, which have the following form:

Dodge:
If $C_A+C_B\geq 1$ $$B(C_A,C_B)=1 \quad (13)$$

Otherwise $$B(C_A,C_B)=C_B/(1-C_A) \quad (14)$$

Burn:
If $C_A+C_B<1$ $$B(C_A,C_B)=0 \quad (15)$$

Otherwise $$B(C_A,C_B)=(C_A+C_B-1)/C_A \quad (16)$$

Note that in these definitions $C_A$ and $C_B$ are normalised colours, i.e. valued in the range [0, 1].

1.0 Overview of Pixel Sequential Rendering System

Figure 5:
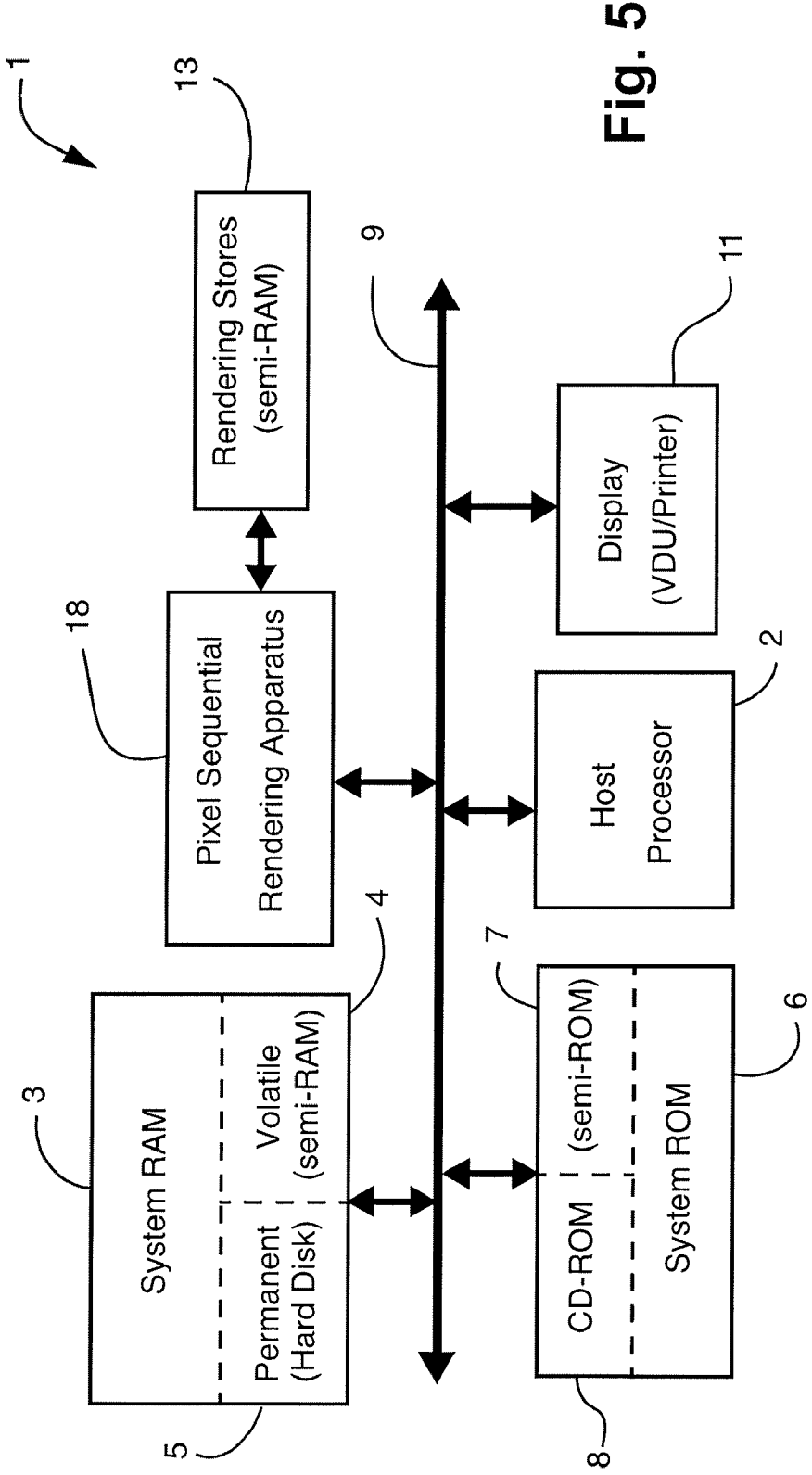
FIG. 5 is a schematic block diagram representation of a computer system incorporating a rendering arrangement.

FIG. 5 illustrates schematically a computer system 1 configured for rendering and presentation of computer graphic object images. The system 1 includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8 or DVD devices. The system 1 may also incorporate some means 11 for displaying images, such as a video display unit (VDU) or a printer, or both, which operate in raster fashion.

The above-described components of the system 1 are interconnected via a bus system 9 and are operable in a normal operating mode of computer systems well known in the art.

Also seen in FIG. 1, a pixel sequential rendering apparatus 18 connects to the bus 9, and is configured for the sequential rendering of pixel-based images derived from graphic object-based descriptions supplied with instructions and data from the processor 2 via the bus 9. The pixel sequential rendering apparatus 18 may utilise the system RAM 3 for the rendering of object descriptions although preferably the rendering apparatus 18 may have associated therewith a dedicated rendering store arrangement 13, typically formed of semiconductor RAM.

The pixel sequential renderer 18 operates generally speaking in the following manner. A render job to be rendered is given to driver software on processor 2 by third party software, for supply to the pixel sequential renderer 18. The render job is typically in a page description language which defines an image comprising objects placed on a page from a rearmost object to a foremost object, to be composited in a manner defined by the render job. The driver software converts the render job to an intermediate render job, which is then fed to the pixel sequential renderer 18.

The pixel sequential renderer 18 generates the colour and opacity for the pixels one at a time in raster scan order. At any pixel currently being scanned and processed, the pixel sequential renderer 18 composites only those exposed objects that are active at the currently scanned pixel. The pixel sequential renderer 18 determines that an object is active at a currently scanned pixel if that pixel lies within the boundary of the object. The pixel sequential renderer 18 achieves this by reference to a fill counter associated with that object. The fill counter keeps a running fill count that indicates whether the pixel lies within the boundary of the object. When the pixel sequential renderer 18 encounters an edge associated with the object the renderer increments or decrements the fill count depending upon the direction of the edge. The renderer 18 is then able to determine whether the current pixel is within the boundary of the object depending upon the fill count and a predetermined winding count rule. The pixel sequential renderer 18 determines whether an active object is exposed with reference to a flag associated with that object. This flag associated with an object indicates whether or not the object obscures lower order objects. That is, this flag indicates whether the object is partially transparent, in which case the lower order active objects make a contribution to the colour and opacity of the current pixel. Otherwise, this flag indicates that the object is opaque, in which case active lower order objects will not make any contribution to the colour and opacity of the currently scanned pixel. The pixel sequential renderer 18 determines that an object is exposed if it is the uppermost active object, or if all the active objects above the object have their corresponding flags set to transparent.

The pixel sequential renderer 18 then composites these exposed active objects to determine and output the colour and opacity for the currently scanned pixel.

The driver software, in response to the page, also extracts edge information defining the edges of the objects for feeding to an edge tracking module. The driver software also generates a linearised table (herein after called the priority properties and status table) of the expression tree of the objects and their compositing operations which is fed to the priority determination module. The priority properties and status table contains one record for each object on the page. In addition, each record contains a field for storing a pointer to an address for the fill of the corresponding object in a fill table. This fill table is also generated by the driver software and contains the fill for the corresponding objects, and is fed to the fill determination module. The priority properties and status table together with the fill table are devoid of any edge information and effectively represent the objects, where the objects are infinitively extending. The edge information is fed to the edge tracking module, which determines, for each pixel in raster scan order, the edges of any objects that intersect a currently scanned pixel. The edge tracking module passes this information onto the priority determination module. Each record of the priority properties and status table contains a counter, which maintains a fill count associated with the corresponding object of the record.

The priority determination module processes each pixel in a raster scan order. Initially, the fill counts associated with all the objects are zero, and so all objects are inactive. The priority determination module continues processing each pixel until it encounters an edge intersecting that pixel. The priority determination module updates the fill count associated with the object of that edge, and so that object becomes active. The priority determination continues in this fashion updating the fill count of the objects and so activating and de-activating the objects. The priority determination module also determines whether these active objects are exposed or not, and consequently whether they make a contribution to the currently scanned pixel. In the event that they do, the pixel determination module generates a series of messages which ultimately instructs the pixel compositing module to composite the colour and opacity for these exposed active objects in accordance with the compositing operations specified for these objects in the priority properties and status table so as to generate the resultant colour and opacity for the currently scanned pixel. These series of messages do not actually contain the colour and opacity for that object but rather an address to the fill table, which the fill determination module uses to determine the colour and opacity of the object.

For ease of explanation the location (viz level) of the object in the order of the objects from the rearmost object to the foremost is herein referred to as the object's priority. Preferably, a number of non-overlapping objects that have the same fill and compositing operation, and that form a contiguous sequence in the order of the objects, may be designated as having the same priority.

The pixel sequential renderer also utilises clip objects to modify the shape of another object. The pixel sequential renderer maintains an associated clip count for the clip in a somewhat similar fashion to the fill count to determine whether the current pixel is within the clip region.

There are often runs of pixels having constant colour and opacity between adjacent edges. The pixel sequential renderer can composite the colour and opacity for the first pixel in the run and in subsequent pixels in the run reproduce the previous composited colour and opacity without any further compositions, thus reducing the overall number of compositing operations.

2.0 Overview of Software Driver

A software program (hereafter referred to as the driver), is loaded and executed on the host processor 2 for generating instructions and data for the pixel-sequential graphics rendering apparatus 18, from data provided by a third-party application. The third-party application may provide data in the form of a standard language description of the objects to be drawn on the page, such as PostScript and PCL, or in the form of function calls to the driver through a standard software interface, such as the Windows GDI or X-11.

The driver software separates the data associated with an object (supplied by the third-party application) into data about the edges of the object, any operation or operations associated with painting the object onto the page, and the colour and opacity with which to fill pixels which fall inside the edges of the object.

The driver software partitions the edges of each object into edges which are monotonic increasing in the Y-direction, and then divides each partitioned edge of the object into segments of a form suitable for the edge module described below. Partitioned edges are sorted by the X-value of their starting positions and then by Y. Groups of edges starting at the same Y-value remain sorted by X-value, and may be concatenated together to form a new edge list, suitable for reading in by the edge module when rendering reaches that Y-value.

The driver software sorts the operations, associated with painting objects, into priority order, and generates instructions to load the data structure associated with the priority determination module. This structure includes a field for the fill rule, which describes the topology of how each object is activated by edges, a field for the type of fill which is associated with the object being painted, and a field to identify whether data on levels below the current object is required by the operation. There is also a field, herein called clip count, that identifies an object as a clipping object, that is, as an object which is not, itself, filled, but which enables or disables filling of other objects on the page.

The driver software also prepares a data structure (the fill table) describing how to fill objects, said fill table is indexed by the data structure in the priority determination module. This allows several levels in the priority determination module to refer to the same fill data structure.

The driver software assembles the aforementioned data into a job containing instructions for loading the data and rendering pixels, in a form that can be read by the rendering system, and transfers the assembled job to the rendering system. This may be performed using one of several methods known to the art, depending on the configuration of the rendering system and its memory.

3.0 Overview of Pixel Sequential Rendering Apparatus

Figure 6:
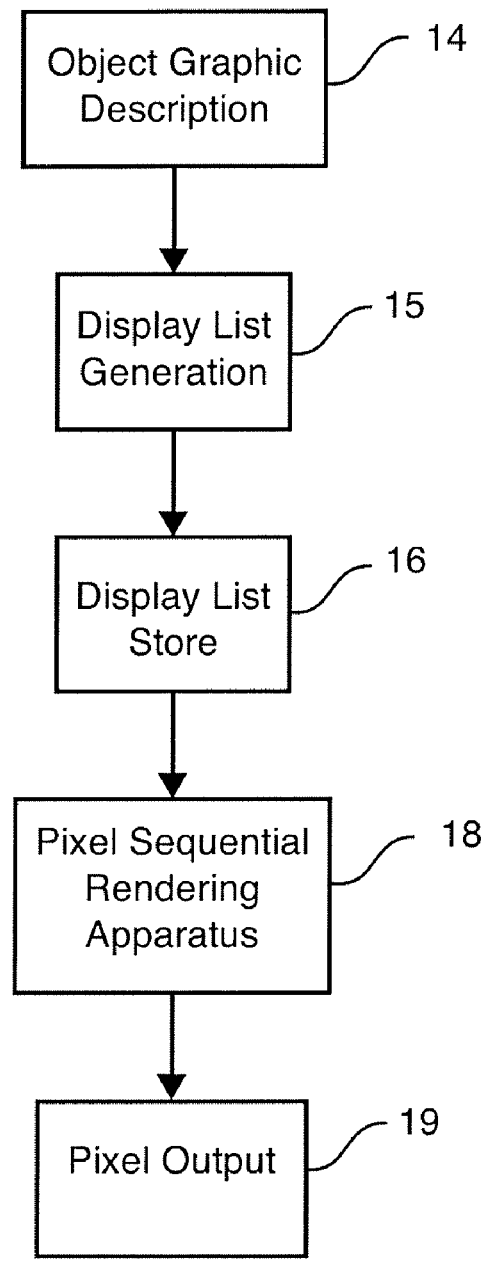
FIG. 6 is a block diagram showing the functional data flow of the rendering arrangement.

Referring now to FIG. 6, a functional data flow diagram of the pixel sequential rendering apparatus 18 (FIG. 5) is shown. The functional flow diagram of FIG. 6 commences with an object graphic description 14 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 18 to render therefrom pixel-based images. For example, the object graphic description 14 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 7A shows a description of an edge 606 that is required to be divided into two segments 601 and 602 in order for the segments to be adequately described and rendered. This arises because the edge description, whilst being simply calculated through a quadratic expression, could not accommodate an inflexion point 604. Thus the edge 606 was dealt with as two separate edges having end points 603 and 604, and 604 and 605 respectively. FIG. 7B shows a cubic spline 610 that is described by endpoints 611 and 612, and control points 613 and 614. This format requires calculation of a cubic polynomial for render purposes and thus is expensive of computational time.

FIGS. 7C and 7D show further examples of edges applicable to the described systems. An edge is considered as a single entity and if necessary, is partitioned to delineate sections of the edge that may be described in different formats, a specific goal of which is to ensure a minimum level of complexity for the description of each section.

In FIG. 7C, a single edge 620 is illustrated spanning scanlines A to M. An edge is described by a number of parameters including start_x, start_y, one or more segment descriptions that include an address that points to the next segment in the edge, and a finish segment used to terminate the edge. The edge 620 may be described as having three step segments, a vector segment, and a quadratic segment. A step segment is simply defined as having an x-step value and a y-step value. For the three step segments illustrated, the segment descriptions are [0,2], [+2,2], and [+2,0]. Note that the x-step value is signed thereby indicating the direction of the step, whilst the y-step value is unsigned as such is always in a raster scan direction of increasing scalene value. The next segment is a vector segment which typically requires parameters start_x (X), start_y (Y), num_of_scanlines (NY) and slope (DX). In this example, because the vector segment is an intermediate segment of the edge 620, the start_x and start_y may be omitted because such arise from the preceding segment(s). The parameter num_of_scanlines (NY) indicates the number of scanlines the vector segment lasts. The slope value (DX) is signed and is added to the x-value of a preceding scanline to give the x-value of the current scanline, and in the illustrated case, DX=+1. The next segment is a quadratic segment which has a structure corresponding to that of the vector segment, but also a second order value (DDX) which is also signed and is added to DX to alter the slope of the segment.

FIG. 7D shows an example of a cubic curve according to an arrangement which includes a description corresponding to the quadratic segment save for the addition of a signed third-order value (DDDX), which is added to DDX to vary the rate of change of slope of the segment. Many other orders may also be implemented.

It will be apparent from the above that the ability to handle plural data formats describing edge segments allows for simplification of edge descriptions and evaluation, without reliance on complex and computationally expensive mathematical operations. In contrast, in the system of FIG. 7A, all edges, whether orthogonal, vector or quadratic were required to be described by the quadratic form.

The rendering system will be described with reference to the simple example of rendering an image 78 shown in FIG. 8 which includes two graphical objects, namely a partly transparent blue-coloured triangle 80 rendered on top of and thereby partly obscuring an opaque red coloured rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 9. In this connection, edge 92 commences at pixel location (40,35) and extends in a raster direction down the screen to terminate at pixel position (40,105). Similarly, the edge 94 extends from pixel position (160,35) to position (160,105). The horizontal portions of the rectangular graphic object 90 may be obtained merely by scanning from the edge 92 to the edge 94 in a rasterised fashion.

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterised direction of left to right. In this specific example because the edge 86 is horizontal like the edges 96 and 98 mentioned above, it is not essential that the edge 86 be defined. In addition to the starting and ending pixel locations used to describe the edges 82 and 84, each of these edges will have associated therewith the slope value, in this case +1 and −1 respectively.

Returning to FIG. 6, having identified the data necessary to describe the graphic objects to the rendered, the graphic system 1 then performs a display list generation step 15.

Figure 10:
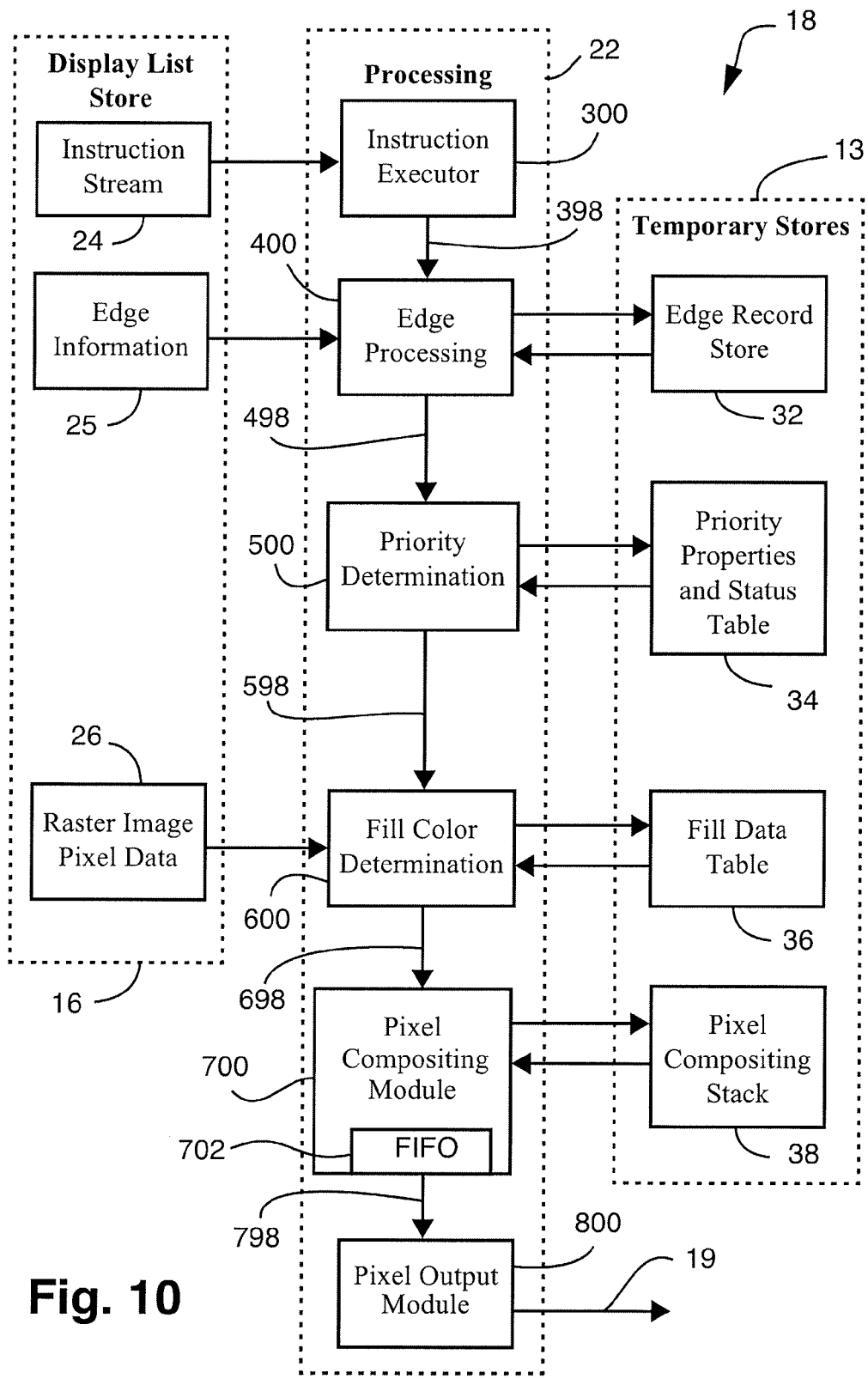
FIG. 10 is a schematic block diagram representation of the pixel sequential rendering apparatus of FIG. 5 and associated display list and temporary stores.

The display list generation 15 is preferably implemented as a software driver executing on the host processor 2 with attached ROM 6 and RAM 3. The display list generation 15 converts an object graphics description, expressed in any one or more of the well known graphic description languages, graphic library calls, or any other application specific format, into a display list. The display list is typically written into a display list store 16, generally formed within the RAM 4 but which may alternatively be formed within the rendering stores 13 (FIG. 5). As seen in FIG. 10 where the configuration of the pixel sequential rendering apparatus 18 is shown, the display list store 16 can include a number of components, one being an instruction stream 24, another being edge information 25 and where appropriate, raster image pixel data 26.

The instruction stream 24 includes code interpretable as instructions to be read by the pixel sequential rendering apparatus 18 to render the specific graphic objects desired in any specific image. For the example of the image shown in FIG. 8, the instruction stream 24 could be of the form of:

(1) render (nothing) to scan line 20;
(2) at scan line 20 add two blue edges 82 and 84;
(3) render to scan line 35;
(4) at scan line 35 add two red edges 92 and 94; and
(5) render to completion.

Figure 8:
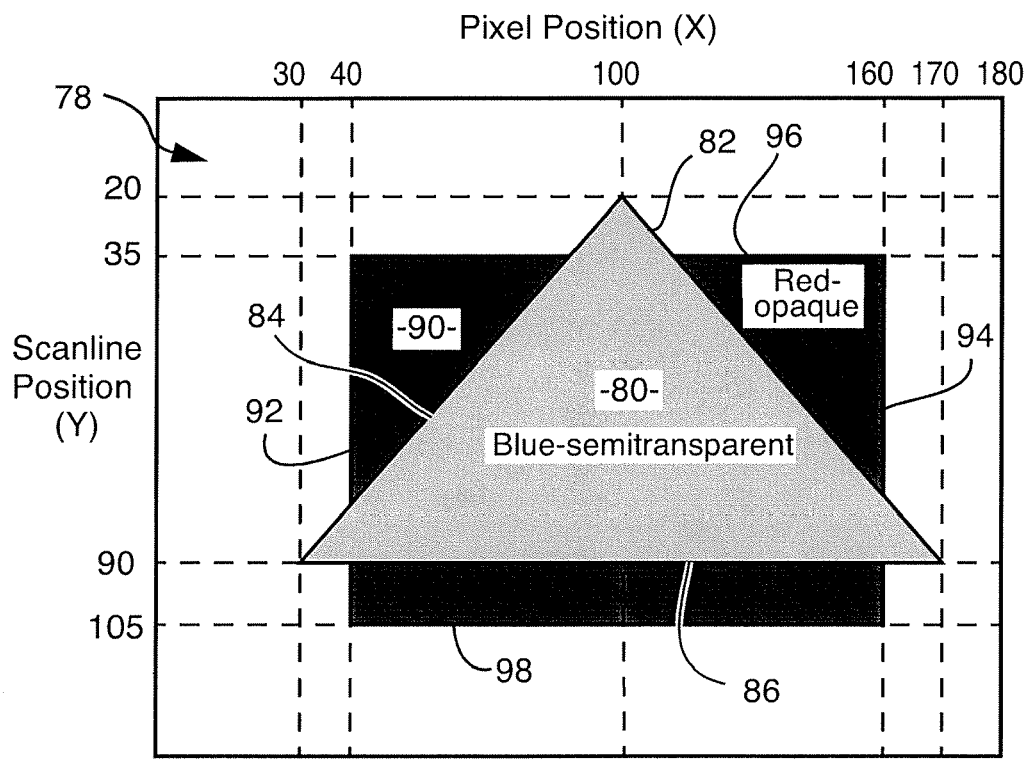
FIG. 8 illustrates a two-object image used as an example for explaining the operation of the rendering arrangement.
Figure 9:
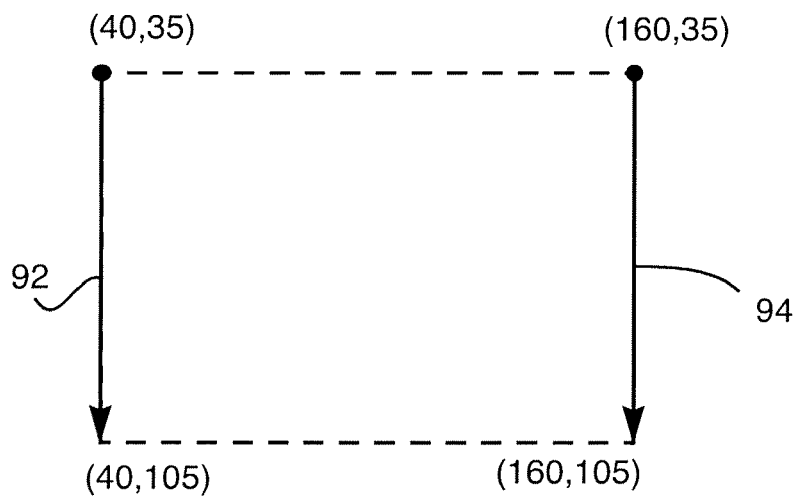
FIG. 9 illustrates vector edges of an object of FIG. 8.

Similarly, the edge information 25 for the example of FIG. 8 may include the following:

(i) edge 84 commences at pixel position 100, edge 82 commences at pixel position 100;
(ii) edge 92 commences at pixel position 40, edge 94 commences at pixel position 160;
(iii) edge 84 runs for 70 scan lines, edge 82 runs for 70 scanlines;
(iv) edge 84 has slope=−1, edge 84 has slope=+1;
(v) edge 92 has slope=0 edge 94 has slope=0.
(vi) edges 92 and 94 each run for 70 scanlines.

It will be appreciated from the above example of the instruction stream 24 and edge information 25 and the manner in which each are expressed, that in the image 78 of FIG. 8, the pixel position (X) and the scanline value (Y) define a single output space in which the image 78 is rendered. Other output space configurations however can be realised using the principles of the present disclosure.

FIG. 8 includes no raster image pixel data and hence none need be stored as raster image pixel data 26 of the display list store 16, although this feature will be described later.

The display list store 16 is read by the pixel sequential rendering apparatus 18, which is typically implemented as an integrated circuit. The pixel sequential rendering apparatus 18 converts the display list into a stream of raster pixels 19 which can be forwarded to another device, for example, a printer, a display, or a memory store.

The pixel sequential rendering apparatus 12 may be implemented as an integrated circuit, or it may be implemented as an equivalent software module executing on a general purpose processing unit, such as the host processor 2.

As is shown in FIG. 10, the configuration of the pixel sequential rendering apparatus 18 includes the display list store 16, the temporary rendering stores 13 and processing stages 22. The processing stages 22 of the pixel-sequential render apparatus 18 include an instruction executor 300, an edge processing module 400, a priority determination module 500, an optimisation module (not shown), a fill colour determination module 600, a pixel compositing module 700, and a pixel output module 800. The processing operations use the temporary stores 13 which as noted above, may share the same device (eg. magnetic disk or semiconductor RAM) as the display list store 16, or may be implemented as individual stores for reasons of speed optimisation. The edge processing module 400 uses an edge record store 32 to hold edge information which is carried forward from scan-line to scan-line. The priority determination module 500 uses a priority properties and status table 34 to hold information about each priority, and the current state of each priority with respect to edge crossings while a scan-line is being rendered. The fill colour determination module 600 uses a fill data table 36 to hold information required to determine the fill colour of a particular priority at a particular position. The pixel compositing module 700 uses a pixel compositing stack 38 to hold intermediate results during the determination of an output pixel that requires the colours from multiple priorities to determine its value.

The display list store 16 and the other stores 32-38 detailed above may be implemented in RAM or any other data storage technology.

The processing stages 22 shown in the arrangement of FIG. 10 take the form of a processing pipeline. In this case, the modules of the pipeline may execute simultaneously on different portions of image data in parallel, with messages passed between them as described below. In another arrangement, each message described below may take the form of a synchronous transfer of control to a downstream module, with upstream processing suspended until the downstream module completes the processing of the message.

3.1 Overview of Pixel Compositing Module

The operation of the pixel compositing module 700 (FIG. 15) will now be described. The primary function of the pixel compositing module is to composite the colour and opacity of all those exposed object priorities that make an active contribution to the pixel currently being scanned.

Preferably, the pixel compositing module 700 implements a modified form of the compositing approach as described in "Compositing Digital Images", Porter, T: Duff, T; Computer Graphics, Vol 18 No 3 (1984) pp 253-259. Examples of Porter and Duff compositing operations are shown in FIG. 11. However, such an approach is deficient in that it only permits handling a source and destination colour in the intersection region formed by the composite, and as a consequence is unable to accommodate the influence of transparency outside the intersecting region. The present arrangement overcomes this by effectively padding the objects with completely transparent pixels. Thus the entire area becomes in effect the intersecting region, and reliable Porter and Duff compositing operations can be performed. This padding is achieved at the driver software level where additional transparent object priorities are added to the combined table. These Porter and Duff compositing operations are implemented utilising appropriate colour operations as will be described below in more detail with reference to FIGS. 13A, 13B, and 12.

Preferably, the images to be composited are based on expression trees. Expression trees are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image. Unary nodes represent an operation which modifies the pixel data coming out of the part of the tree below the unary operator. A binary node typically branches to left and right subtrees; wherein each subtree is itself an expression tree comprising at least one leaf node. An example of an expression tree is shown in FIG. 14C. The expression tree shown in FIG. 14C comprises four leaf nodes representing three objects A, B, and C, and the page. The expression tree of FIG. 14C also comprises binary nodes representing the Porter and Duff OVER operation. Thus the expression tree represents an image where the object A is composited OVER the object B, the result of which is then composited OVER object C, and the result of which is then composited OVER the page.

Figure 14A:
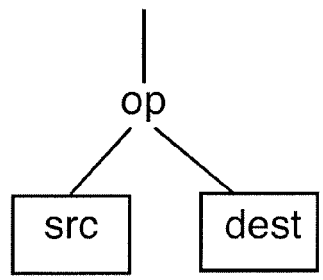
FIGS. 14A and 14B show a simple compositing expression illustrated as an expression tree and a corresponding depiction.
Figure 14B:
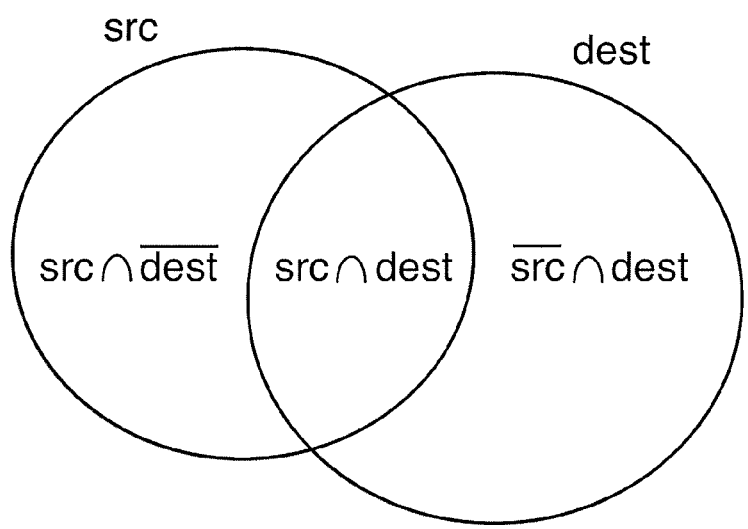
Figure 14C:
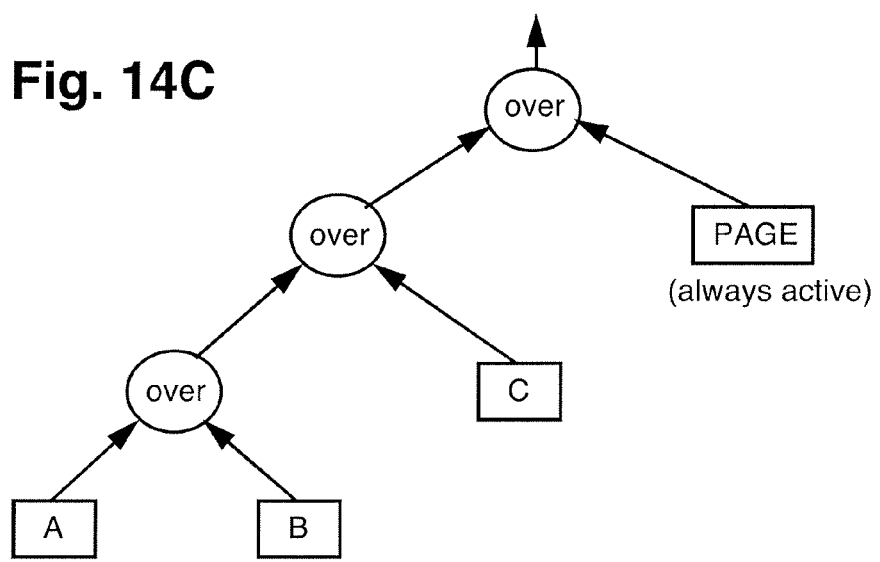
FIG. 14C shows an example of an expression tree.

Turning now to FIGS. 14A and 14B, there is shown a typical binary compositing operation in an expression tree. This binary operator operates on a source object (src) and a destination object (dest), where the source object src resides on the left branch and the destination object (dest) resides on the right branch of the expression tree. The binary operation is typically a Porter and Duff compositing operation. The area src ∩ dest represents the area on the page where the objects src and dest objects intersect (i.e. both active), the area src∩$\overline{\text{dest}}$ where only the src object is active, and the area $\overline{\text{src}}$∩dest where only the dest object is active.

The compositing operations of the expression tree are implemented by means of the pixel compositing stack 38 (FIG. 10), wherein the structure of the expression tree is implemented by means of appropriate stack operations on the pixel compositing stack 38.

Figure 15:
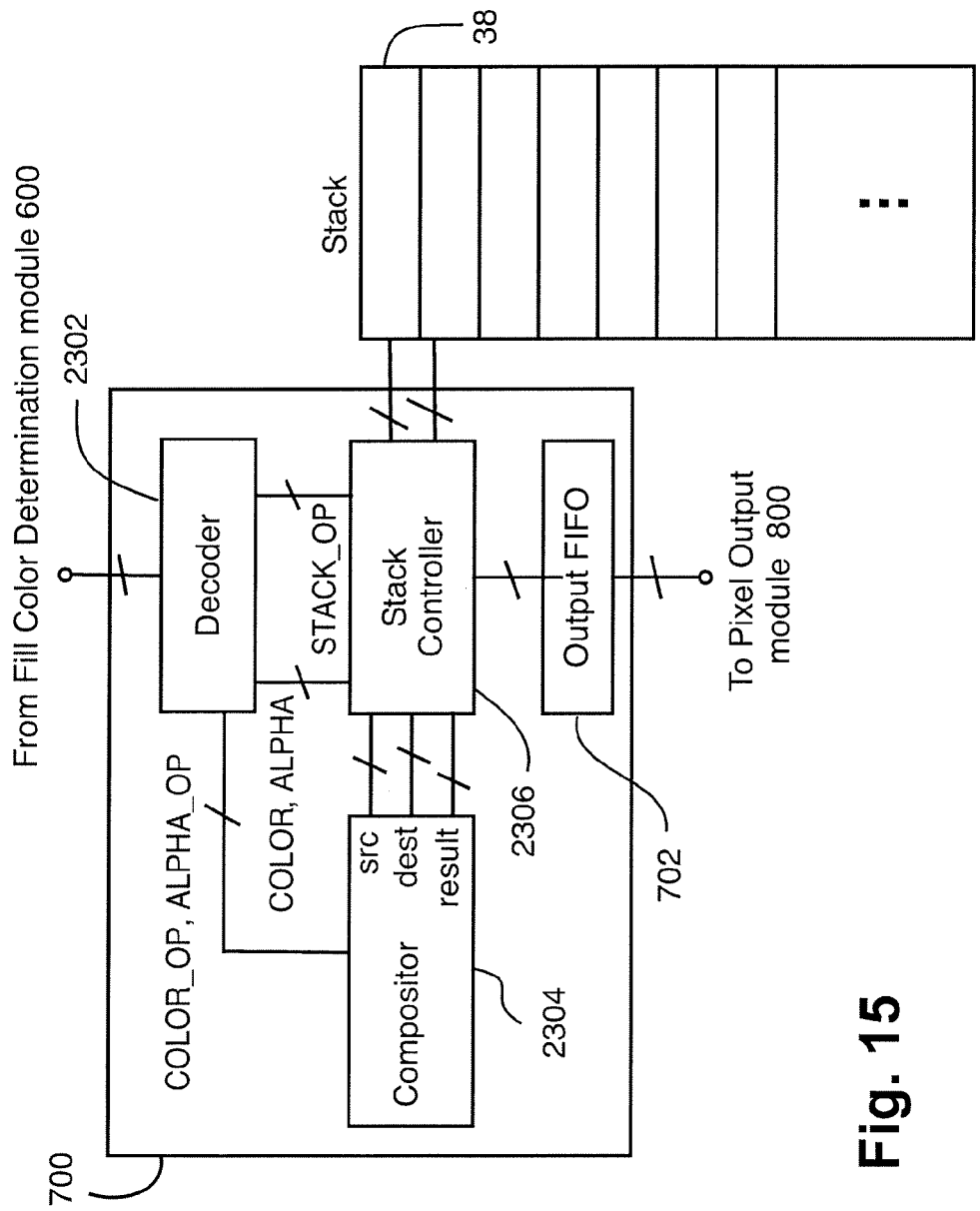
FIG. 15 is a schematic functional representation of one arrangement of the pixel compositing module of FIG. 10.

FIG. 15 shows the pixel compositing module 700 in accordance with one arrangement in more detail. The pixel compositing module 700 receives incoming messages from the fill colour determination module 600. These incoming messages include repeat messages, series of colour composite messages, end of pixel messages, and end of scanline messages, and are processed in sequence.

Figure 16:
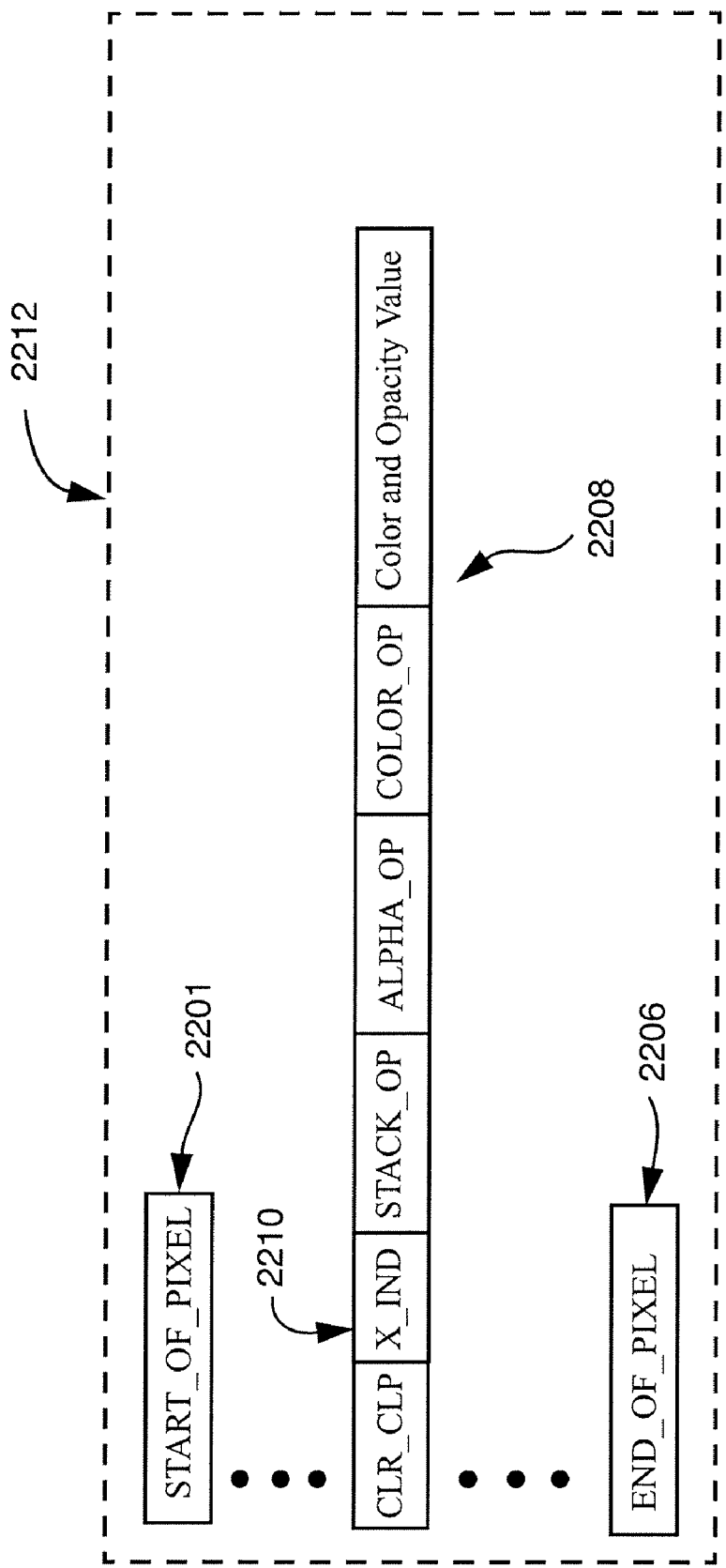
FIG. 16 shows a series of colour composite messages generated by the fill colour determination module.

A message sequence 2212 is illustrated in FIG. 16. The sequence includes a START_OF_PIXEL message 2201, then one or more colour composite messages 2208 followed by an END_OF_PIXEL message 2206. The colour composite messages 2208 are identified by a CLR_CMP field 2210. The X_IND field contains a flag indicating whether the colour is constant for a given Y-value. The message also includes a stack operation code STACK_OP, an alpha channel operation code ALPHA_OP, a raster operation code COLOR_OP and a field containing the colour and opacity value of the priority.

Referring again to FIG. 15, the pixel compositing module 700 comprises a decoder 2302 for decoding these incoming messages and a compositor 2304 for compositing the colours and opacities contained in the incoming colour composite messages. The pixel compositing module 700 also comprises a stack controller 2306 for placing the resultant colours and opacities on the stack 38, and output FIFO 702 for storing the resultant colour and opacity.

During the operation of the pixel compositing module 700, the decoder 2302, upon the receipt of a colour composite message, extracts the raster operation COLOR_OP and alpha channel operation codes ALPHA_OP and passes them to the compositor 2304. The decoder 2302 also extracts the stack operation STACK_OP and colour and opacity values COLOR, ALPHA of the colour composite message and passes them to the stack controller 2306. Typically, the pixel compositing module 700 combines the colour and opacity from the colour composite message with a colour and opacity popped from the pixel compositing stack 38 according to the raster operation and alpha channel operation from the colour composite message. The module 700 then pushes the result back onto the pixel compositing stack 38. More generally, the stack controller 2306 forms a source (src) and destination (dest) colour and opacity, according to the stack operation specified. If at this time, or during any pop of the pixel compositing stack, the pixel compositing stack 38 is found to be empty, an opaque white colour value is used without any error indication. These source and destination colours and opacity are then made available to the compositor 2304 which performs the compositing operation in accordance with the COLOR_OP and ALPHA_OP codes. The resultant (result) colour and opacity is then made available to the stack controller 2306, which stores the result on the stack 38 in accordance with the STACK_OP code. These stack operations are described below in more detail.

During the operation of the pixel compositing module 700, if the decoder 2302 receives an end of pixel message, it then instructs the stack controller 2306 to pop a colour and opacity from the pixel compositing stack 38. If the stack 38 is empty an opaque white value is used. The resultant colour and opacity is then formed into a pixel output message which is forwarded to the pixel output FIFO 702. If the decoder 2302 receives a repeat message or an end of scanline message, the decoder 2302 by-passes (not illustrated) the compositor 2304 and stack controller 2306 and forwards the messages to the pixel output FIFO 702 without further processing.

Figure 17A:
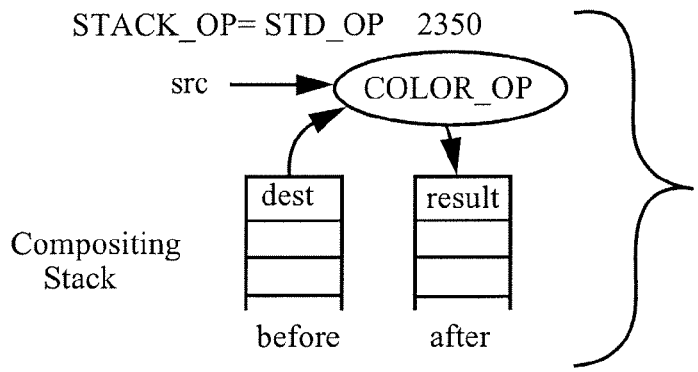
FIGS. 17A-17D show the operation performed on the stack for each of the various stack operation commands in the Pixel Compositing Module of FIG. 10.

FIGS. 17A, B, C, and D show the operation performed on the pixel compositing stack 38 for each of the various stack operation commands STACK_OP in the colour composite messages.

FIG. 17A shows the standard operation STD_OP 2350 on the pixel compositing stack 38, where the source colour and opacity (src) are obtained from the colour composite message, and the destination colour and opacity (dest) are popped from the top of the pixel compositing stack 38. The source colour and opacity (sre) are taken from the value in a current colour composite message for the current operation, and destination colour and opacity (dest) are popped from the top of the stack 38. The result of the COLOR_OP operation performed by the compositor 2304 is pushed back onto the stack 38.

Figure 17B:
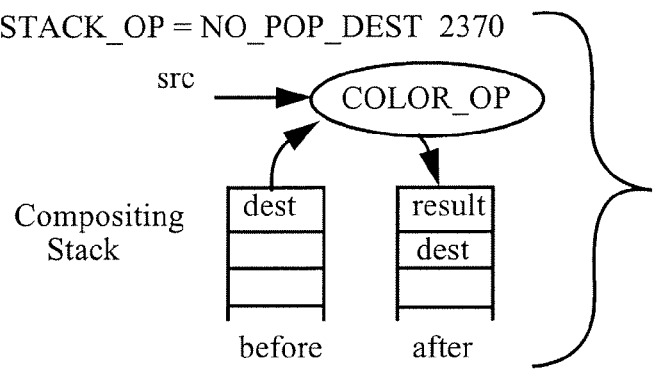

FIG. 17B shows the NO_POP_DEST stack operation 2370 on the pixel compositing stack 38. The source colour and opacity (src) is taken from the value in a current composite message for the current operation, and the destination colour and opacity (dest) is read from the top of the stack 38. The result of the COLOR_OP operation performed by the compositor 2304 is pushed onto the top of the stack 38.

Figure 17C:
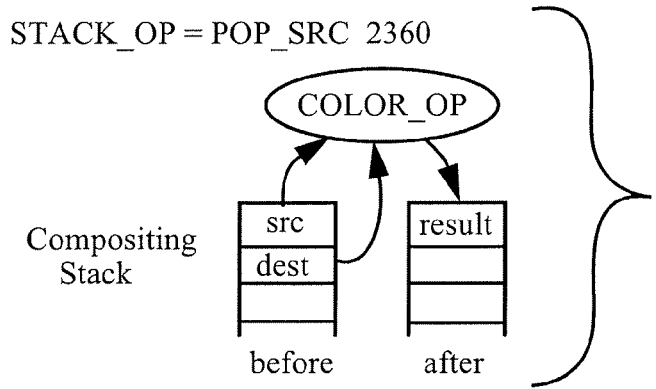

FIG. 17C shows the POP_SRC stack operation, where the source colour and opacity are popped from the top of the stack, and the destination colour and opacity is popped from the next level down the stack. The result of the COLOR_OP operation performed by the compositor 2304 is pushed onto the top of the stack.

Figure 17D:
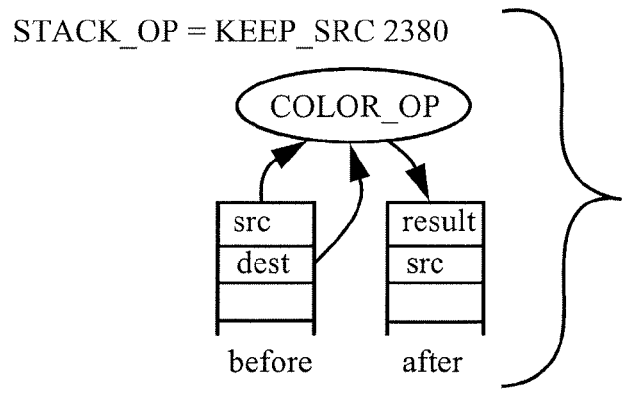

FIG. 17D shows the KEEP_SRC stack operation, where the source colour and opacity are popped from the top of the stack, and the destination colour and opacity is popped from the next level down the stack. The result of the COLOR_OP operation performed by the compositor 2304 is pushed onto the top of the stack.

Other stack operations may also be used.

The manner in which the compositor 2304 combines the source (src) colour and opacity with the destination (dest) colour and opacity will now be described with reference to FIGS. 4A to 4C. For the purposes of this description, colour and opacity values are considered to range from 0 to 1, (i.e. normalised) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 4A shows a source pixel 702 which has some three component colour values not shown in the Figure and an opacity value, (so). The shaded region of the source pixel 702 represents the fully opaque portion 704 of the pixel 702. Similarly, the non-shaded region in FIG. 4A represents that proportion 706 of the source pixel 702 considered to be fully transparent. FIG. 4B shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay of these two pixels is shown in FIG. 4C. Three regions of interest exist, which include a 'source outside destination' region 718 which has an area of so*(1−do), a 'source intersect destination' 720 which has an area of so*do, and a 'destination outside source' 722 which has an area of (1−so)*do. The colour value of each of these three regions 718, 720 and 722 is calculated conceptually independently. The source outside destination region 718 takes its colour directly from the source colour. The destination outside source region 722 takes its colour directly from the destination colour. The source intersect destination region 720 takes its colour from a combination of the source and destination colour.

The process of combining the source and destination colour, as distinct from the other operations discussed above, is termed a raster operation and is one of a set of functions as specified by the raster operation code from the pixel composite message. Some of the raster operations are shown in FIG. 12. Each function is applied to each pair of colour components of the source and destination colours to obtain a like component in the resultant colour. Many other functions are possible.

The alpha channel operation from the composite pixel message is also considered during the combination of the source and destination colour. The alpha channel operation is performed using three flags LAO_USE_D_OUT_S. LAO_USE_S_OUT_D, LAO_USE_S_ROP_D, which respectively identify the regions of interest: (1−so)*do, so*(1−do), and so*do in the overlay of the source pixel 702 and the destination pixel 710. For each of the regions, a region opacity value is formed which is zero if the corresponding flag in the alpha channel operation is not set, else it is the area of the region.

The resultant opacity is formed from the sum of the region opacities. Each component of the result colour is then formed by the sum of the products of each pair of region colour and region opacity, divided by the resultant opacity.

As shown in FIGS. 13A and B, the Porter and Duff operations may be formed by suitable ALPHA_OP flag combinations and raster operators COLOR_OP, provided that both operands can be guaranteed to be active together. Because of the way the table is read, if only one of the operands is not active, then the operator will either not be performed, or will be performed with the wrong operand. Thus, objects that are to be combined using Porter and Duff operations must be padded out with transparent pixels to an area that covers both objects in the operation. Other transparency operations may be formed in the same way as the Porter and Duff operations, using different binary operators as the COLOR_OP operation.

The resultant colour and opacity is passed to the stack controller circuit and pushed onto the pixel compositing stack 38. However, if the stack operation is STACK_KEEP_SRC, the source value is pushed onto the stack before the result of the colour composite message is pushed.

When an end of pixel message is encountered, the colour and opacity value on top of the stack is formed into a pixel output message, and sent to the Pixel Output module. Repeat pixel messages are passed through the Pixel Compositing module to the Pixel Output module.

4.0 Blends in a Pixel Sequential Renderer

The pixel sequential rendering apparatus 18 described above can perform the standard 'over' based blending operations. These operations are described in the background art. The equation to describe an 'over' based blending operation is:

$$\alpha_{result}C_{result} = \alpha_A(1-\alpha_B)C_A + (1-\alpha_A)\alpha_B C_B + \alpha_A\alpha_B B(C_A, C_B) \quad (17)$$

$$\alpha_{result} = \alpha_A(1-\alpha_B) + (1-\alpha_A)\alpha_B + \alpha_A\alpha_B \quad (18)$$

where $B(C_A, C_B)$ is the blending function.

To perform such a blending operation, the software driver sets the COLOR_OP operation code to the appropriate value to represent the blending function, $B(C_A, C_B)$. The driver sets the three ALPHA_OP flags LAO_USE_D_OUT_S. LAO_USE_S_ROP_D and LAO_SE_S_OUT_D. Setting these flags indicates that all three regions of interest should be considered in this calculation.

The pixel sequential rendering apparatus 18 in the first arrangement is also driven in such a way as to implement the atop-based blending operation:

$$\alpha_{result}C_{result} = (1-\alpha_A)\alpha_B C_B + \alpha_A\alpha_B B(C_A, C_B) \quad (19)$$

$$\alpha_{result} = \alpha_B \quad (20)$$

Performing the blending operation as described by Equations (19) and (20) does not permit the colour of the blending object (Object A) to influence the resultant colour except through the blending function. The modified atop-based blending operations also share the benefit of the over-based blending operations that when an effect is applied, the effect is restricted to the area of the blending object, i.e. Object B is not modified outside the area of intersection with Object A. The blending function used for the blending operation, $B(C_A, C_B)$, will be controlled using the COLOR_OP opcode.

To blend using the atop-based blending operation as described above the software driver sets the LAO_USE_D_OUT_S and the LAO_USE_S_ROP_D flags in the priority table entries that control the effect, leaving the LAO_USE_S_OUT_D flag unset. FIG. 13B indicates this to be the same combination used by the Porter and Duff atop operator. The COLOR_OP opcode is set to an appropriate value to give the correct blending of source and destination colours specified by the blending function.

The atop based blending operation is advantageous compared to blending operations based upon the over operator as the colour of the effect (object A) only affects the resultant composited value through the blending function.

Figure 3B:
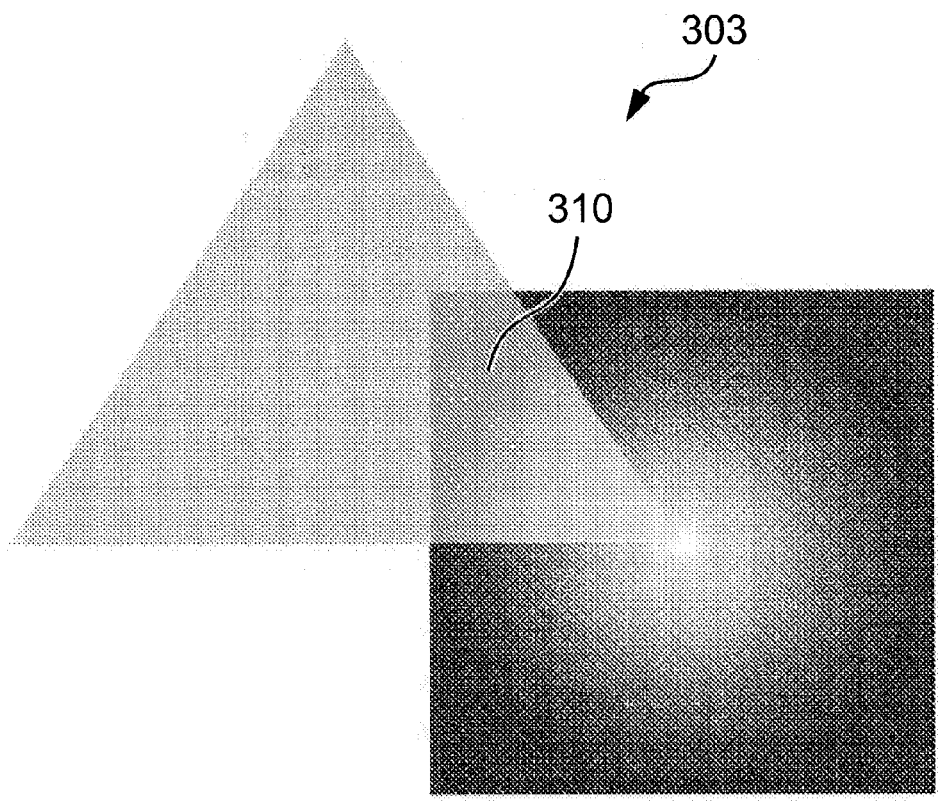
FIG. 3B shows the result of blending the objects of FIG. 3A using the over-based 'dodge' blending operation.
Figure 3C:
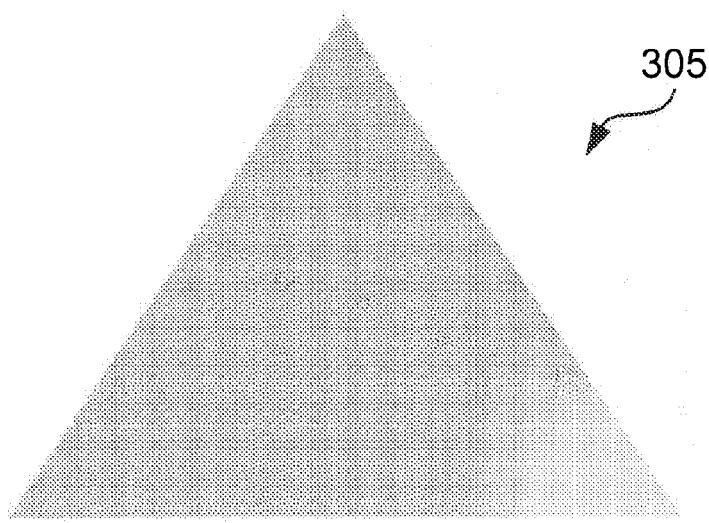
FIG. 3C shows the result of blending the objects of FIG. 3A using a Foreground Correction Method to produce the result of an atop-based 'dodge' blending operation.

FIG. 3C shows the result 305 of blending the partially transparent object 301 (Object B) with the blending object 302 (Object A) shown in FIG. 3A using an atop-based blending operation. For comparison, the result 303 of the prior art over-based blending operation is shown in FIG. 3B. Note that Object B 301 is partially transparent, allowing the black colour of Object A 302 to adversely affect the results when the over based blending operation is used, as seen in FIG. 3B. In contrast, when the atop based blending operation is used, the black colour of object A 301 does not leak into the result 305.

The pixel sequential rendering apparatus 18 is also capable of implementing blending operations based on the Porter and Duff in operator. The modified in-operator-based blending operations may be expressed as:

$$\alpha_{result} C_{result} = \alpha_A \alpha_B B(C_A, C_B) \quad (21)$$

$$\alpha_{result} = \alpha_A \alpha_B \quad (22)$$

This can be realised in the pixel sequential rendering apparatus 18 described previously by only setting the LAO_USE_S_ROP_D flag and leaving both the LAO_USE_D_OUT_S and LAO_USE_S_OUT_D flags unset. Once again the COLOR_OP opcode should be set appropriately for the blending function required, $B(C_A, C_B)$. This modified operator has the disadvantage of modifying pixels over the entire area of Object B.

5.0 Blends in a Framestore Renderer

In an alternative arrangement, the atop-based blending operations are implemented in a framestore (alternatively called a Painter's Algorithm) renderer. A framestore renderer is well known in the prior art and will not be explained in great detail. In general, a framestore render immediately renders each graphical object to a memory representing the entire image. The memory will typically be a matrix/array of pixels. For this particular implementation the framestore renderer must also be able to read the values previously written into the framestore. This particular framestore must contain both colour and opacity values, the opacity values being normalised to the range 0 to 1.

A blending operation based on the Porter and Duff over compositing operation is known in the prior art to be suited to a framestore renderer. A blending operation based on the atop Porter and Duff operator according to the present disclosure is also suitable for a framestore renderer. Equations (19) and (20) show the modified atop-based blending operation.

Object B may be considered to be the background that is already written into the framestore. Object A is the object to be blended with the background (Object B). The result of blending Object A with Object B has the opacity of Object B. The colour of the result is the sum of two terms, one a product of the opacities of Objects A and B and the blending function, the other term a product of the opacity of Object B, the complement of the opacity of Object A (i.e. the transparency of Object A), and the colour of Object B.

Object B has already been drawn to the frame store. Object A is then to be blended with Object B. For each pixel in Object A, the corresponding colour and opacity values are read from the framestore for Object B. These colour and opacity values are used in conjunction with the values from Object A and the blending function to determine the new colour value for the corresponding framestore pixel. This new value is written into the framestore to replace the previous value. The opacity value for this pixel does not need to change, as the resultant opacity is equal to the opacity of Object B.

Figure 18:
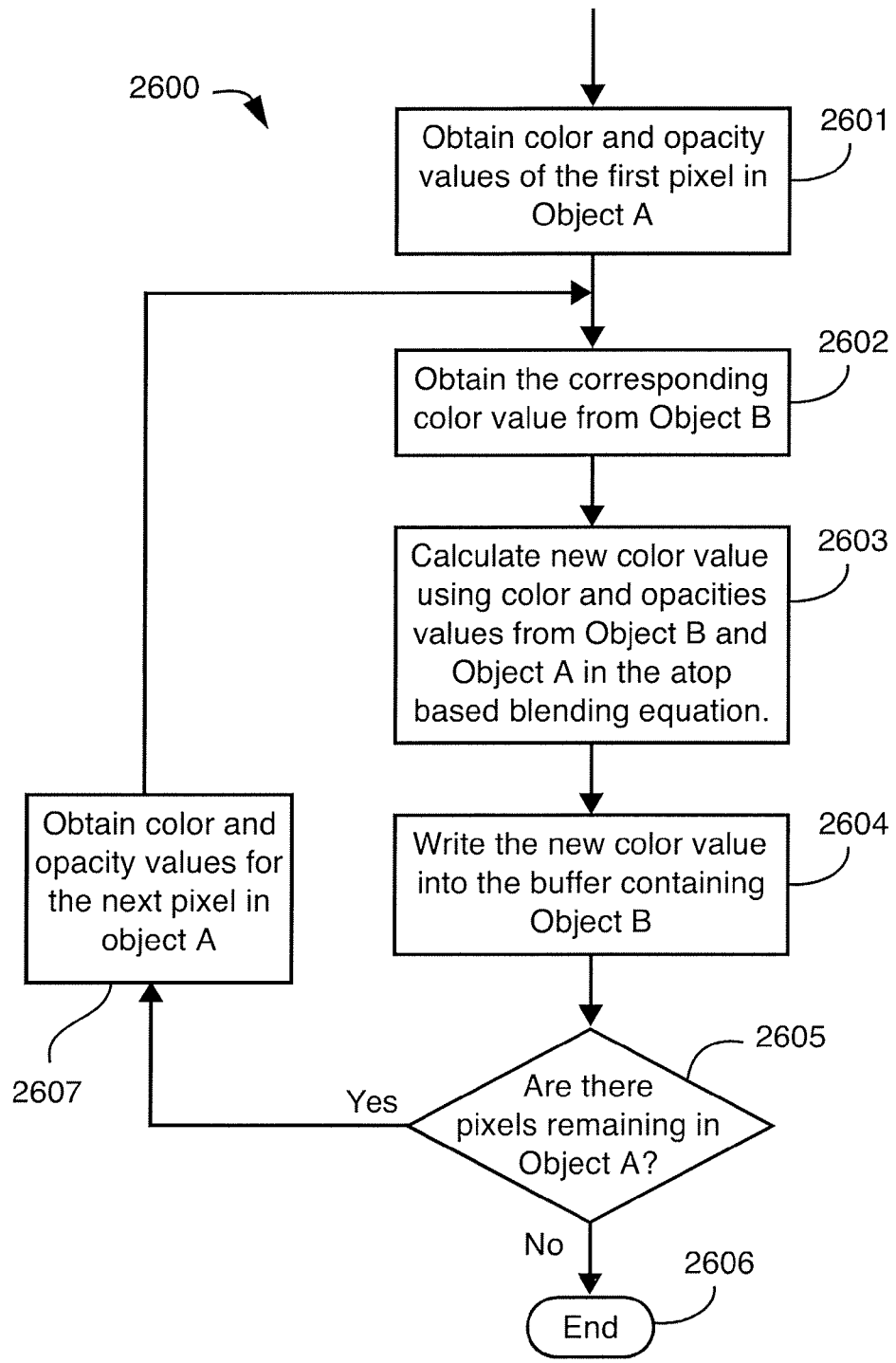
FIG. 18 is a schematic flow diagram of a method of compositing two operands with a blend function.

The atop based blending operation of the first arrangement may be implemented using a method 2600 as shown in FIG. 18. In step 2601 the colour and opacity values of first pixel in object A are obtained either from a buffer containing a rasterised representation of Object A, or from rendering Object A one pixel at a time concurrently with the method 2600.

Method 2600 then enters a loop which steps through the pixels of Object A. In step 2602, which is the first step in the loop, the corresponding colour value for the current pixel is read from the buffer containing Object B. Then, in step 2603, the colour and opacity of Object A and Object B are used to calculate the new colour value for the pixel of the buffer containing Object B. If Object B has not painted this pixel of the buffer, the colour and opacity information used is that of transparent black.

In step 2604 the new colour value is then written into the buffer containing object B. When using atop based blending operations the opacity of the buffer containing Object B does not change.

Next, in step 2605, the method 2600 checks whether there are any more pixels in Object A. If so, (the YES option of step 2605), execution proceeds to step 2607, in which the colour and opacity of the next pixel in Object A are obtained before the method 2600 returns to step 2602 from where the next pixel is processed. If there are no pixels left in Object A (the NO option of step 2605), the method 2600 ends in step 2606.

The results of the blend using the framestore renderer are identical to those of the pixel sequential rendering arrangement described in section 4.0. FIG. 3C shows the result of the atop based blending operation. Comparison can be made with the over based blending operation results shown in FIG. 3B.

Object A or Object B may be a group of objects that are, for the purposes of compositing, treated as a single object. In particular Object B may be the background, i.e. the result of previous rendering and compositing operations.

A modified blending operation based on the Porter and Duff in operator may also be implemented in the framestore renderer. This modified operator is less advantageous in a framestore renderer than the blending operation based on the atop operator. The complication is that the use of the in operator means that pixels are modified over the entire area of the operator. More specifically pixels modified by this operation are not limited to the intersection of the two objects. All pixels within the union of object A and object B are modified by a blend operation based on the in operator.

Equations (21) and (22) represent an in based blending operation.

Object B can be considered to be the background that is already written into the framestore. Object A is the object to be blended with the background (Object B). The result of blending Object A with Object B has opacity equal to the product of Object A and Object B's opacities. The resulting pre-multiplied colour is the product of the opacities of Objects A and B and the blending function. Object B and Object A are cleared (i.e. set to transparent black) outside the intersecting region.

6.0 Foreground Correction Method

The Foreground Correction Method described herein is a method for modifying the result of blending operations to produce a desired effect or alternative result. The Foreground Correction Method may be particularly advantageous when an underlying software graphics library or a graphics or rendering system (e.g. the pixel sequential rendering apparatus 18 shown in FIG. 5) only implements blend operations that are based on one Porter and Duff operator. A particular case is where the available blending operation is based on the Porter and Duff src-over operator. The methods described herein enable the output of the blending operation to be modified to produce the same effect obtained by blend operations based on other Porter and Duff operators. This provides a system that only implements a limited set of blending operations (i.e. only over-based) with a means to produce the effects of additional blending operations based on other Porter and Duff operators.

Figure 19:
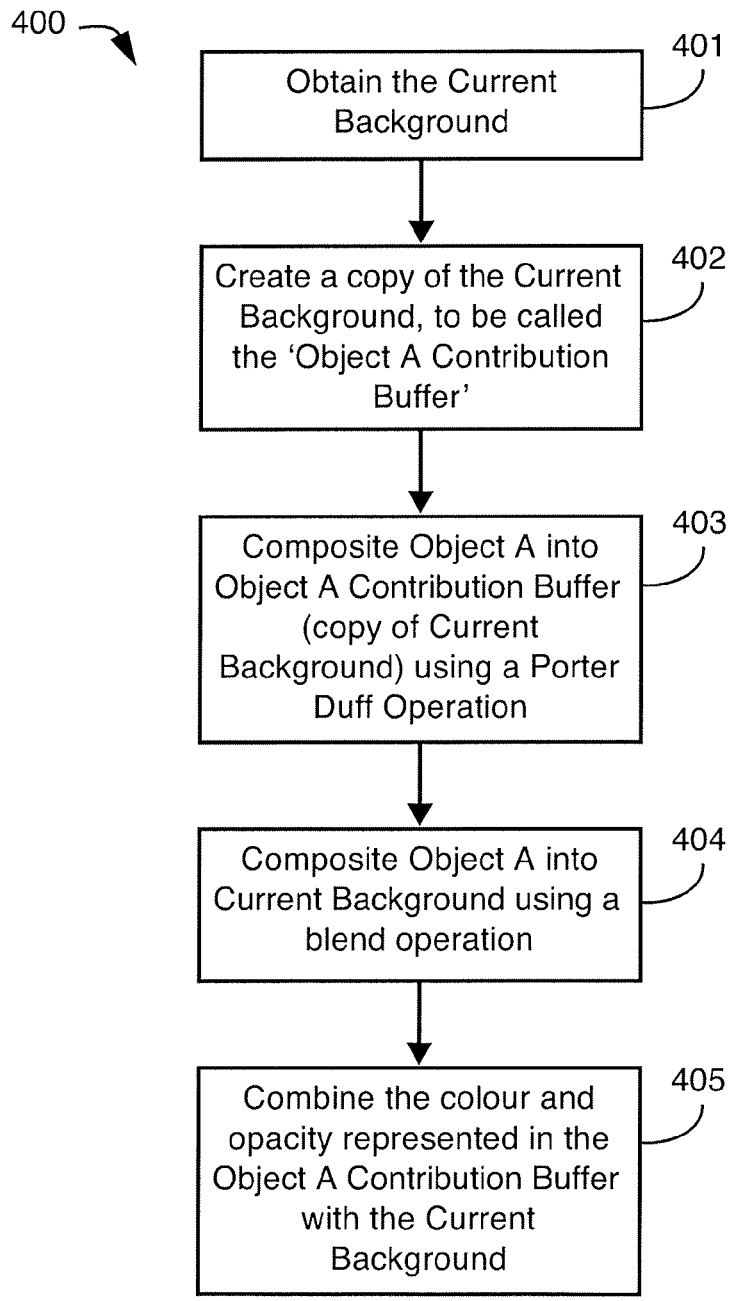
FIG. 19 is a schematic flow diagram showing the general steps of a Foreground Correction Method.

FIG. 19 shows a schematic flow diagram of a generalised Foreground Correction Method 400, which may, for example, be implemented as part of the pixel sequential rendering apparatus 18. The Foreground Correction Method 400 composites two Objects A and B. Object A represents the desired graphic object (or 'effect') to composite with previously composited objects. Object A has colour and opacity values. Object B represents the Current Background. The Current Background may be empty (i.e. blank), a subset of the previously composited objects, or all of the previously composited objects. In each case the Current Background will have colour and opacity values.

The generalised Foreground Correction Method 400 starts in step 401 where the Current Background (Object B) is obtained. Obtaining the Current Background may involve retrieving or calculating the in-memory representation of either a subset or all of the previously rendered objects. The Current Background (Object B) will be known as a First Graphic Element containing colour and opacity values. Similarly Object A will be known as a Second Graphic Element containing colour and opacity values. The Current Background may be retrieved from the rendering stores 830.

In step 402 a copy of the First Graphic Element (Object B) is made prior to any blending operations. The copy of the First Graphic Element (Object B) will be known as the Object A Contribution Buffer.

In step 403 the Second Graphic Element (Object A) is composited into the Object A Contribution Buffer using a Porter and Duff operator. The resultant of this compositing operation can be considered to be a First Intermediate Result.

In step 404 the Second Graphic Element (Object A) is composited with the First Graphic Element (Object B) using a blend operation. This resultant can be considered to be a Second Intermediate Result. Note that the blend operation used to produce this result could be a blend operation based on any Porter and Duff operator, even though in many systems the only available blend operation is based on the Porter and Duff src-over operator.

Finally, in step 405, the colour and opacity values of the First Intermediate Result (result in Object A Contribution Buffer) are combined with the colour and opacity values of the Second Intermediate Result (Current Background result) to produce a final result. The combining step may be an addition or a subtraction, depending on the blending operation being performed.

In a first arrangement, the Foreground Correction Method corrects the resultant of compositing the Objects A and B using an over-based blend operation. In the example of FIGS. 3A-3C, the black of Object A 302 that darkens the resultant colour in the overlapping region 310 as shown in FIG. 3B can be removed from the result using the first arrangement of the Foreground Correction Method.

Figure 20:
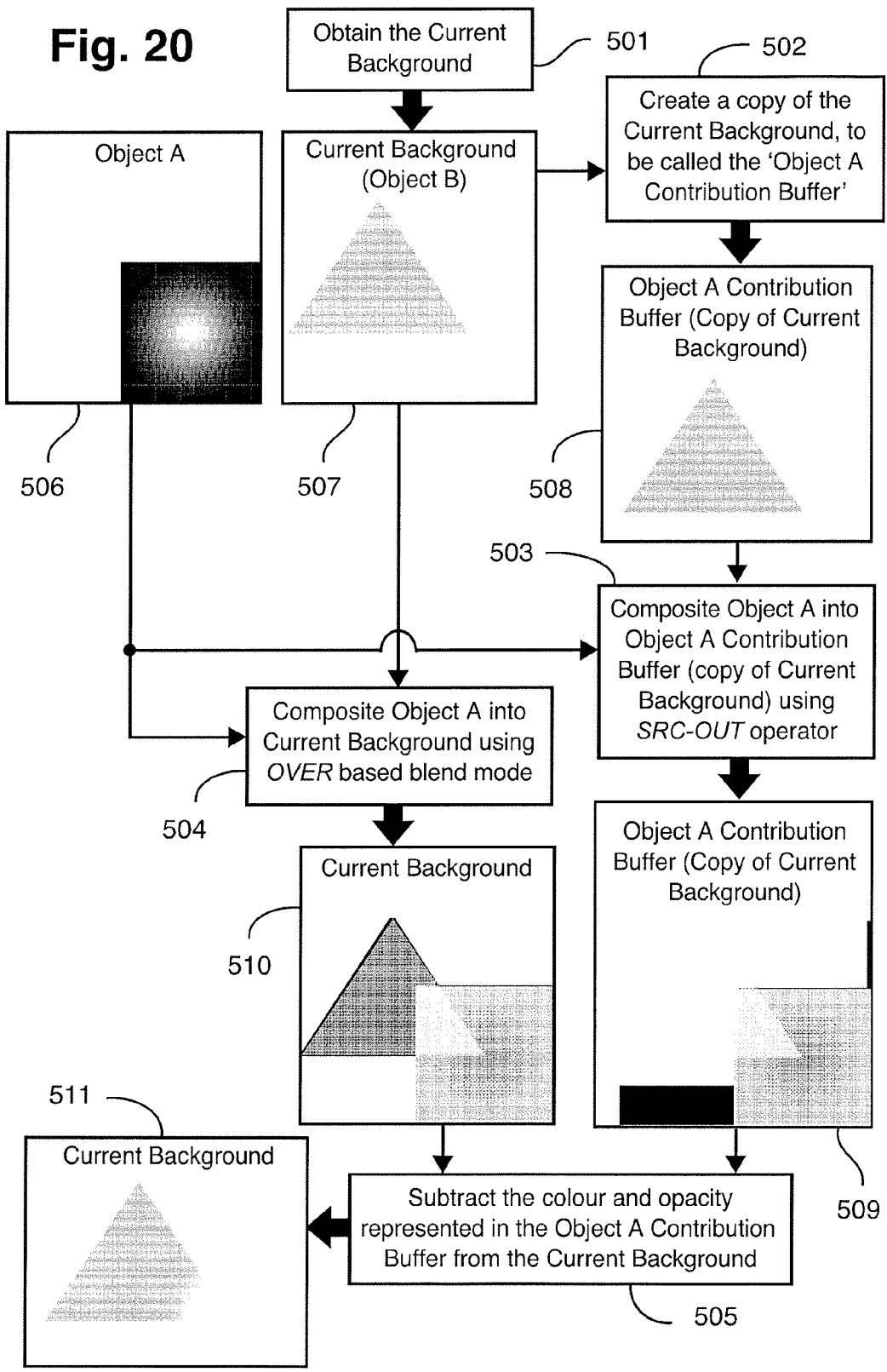
FIG. 20 illustrates the use of the Foreground Correction Method of FIG. 19 in producing an atop-based 'dodge' blending operation result.

FIG. 20 illustrates how the steps of the generalised Foreground Correction Method 400 can be particularised to produce the atop-based 'dodge' blending result 305 shown in FIG. 3C. In the first arrangement, the compositing operator used in step 403 is a src-out operator and the blend operation of step 404 is an over-based blend operation. The combining operation of step 405 is a subtraction. FIG. 20 illustrates the method steps of the first arrangement using the objects 301 and 302 shown in FIG. 3A.

Object A 506 represents the desired graphic object to composite with previously composited objects. In the example, Object A 506 (identifiable with object 302 in FIG. 3A) is a black square having a circular region in which the colour varies radially from a black circumference to a white centre. Object A contains colour and opacity values. Object B represents the Current Background. The Current Background may be empty (i.e. blank), a subset of the previously composited objects, or all of the previously composited objects. In each case the Current Background will have colour and opacity values. In the example, Object B 507 (identifiable with object 301 of FIG. 3A) is a partially-transparent grey triangle.

The first step 501 of the first arrangement is to obtain the Current Background (Object B) 507 (as in step 401). Obtaining the Current Background 507 may involve retrieving or calculating the in-memory representation of either a subset or all of the previously rendered objects. The Current Background 507 will be known as a First Graphic Element containing colour and opacity values. Similarly Object A will be known as a Second Graphic Element containing colour and opacity values.

In step 502 (as in step 402), a copy of the Current Background 507 is made prior to any blending operations. The copy 508 of the Current Background is stored in the Object A Contribution Buffer. At this point the contents of both the Current Background 507 and the Object A Contribution Buffer 508 should be identical.

In step 503 (a special case of step 403) the Second Graphic Element (Object A) 506 is composited into the Object A Contribution Buffer using the src-out Porter and Duff operator:

$$C_{src\text{-}out}\alpha_{src\text{-}out} = C_A\alpha_A(1-\alpha_B) \quad (23)$$

$$\alpha_{src\text{-}out} = \alpha_A(1-\alpha_B) \quad (24)$$

where:

$C_{src\text{-}out}$=resultant colour of src-out Porter and Duff operator; and $\alpha_{src\text{-}out}$=resultant opacity of src-out Porter and Duff operator.

This resultant 509 can be considered to be a First Intermediate Result.

In step 504 (a special case of step 404) the Second Graphic Element (Object A) 506 is composited with the First Graphic Element 507 using an over-based 'dodge' blend operation $$C_{over\text{-}blend}\alpha_{over\text{-}blend} = C_A\alpha_A(1-\alpha_B) + C_B\alpha_B(1-\alpha_A) + B(C_A, C_B)\alpha_A\alpha_B \quad (25)$$

$$\alpha_{over\text{-}blend} = \alpha_A(1-\alpha_B) + \alpha_B(1-\alpha_A) + \alpha_A\alpha_B \quad (26)$$

where (for a 'dodge' operation) $B(C_A, C_B)$ is defined as:
if $(C_A + C_B) \geq 1$ $$B(C_A, C_B) = 1 \quad (27)$$

else $$B(C_A, C_B) = C_B \cdot 1/(1-C_A) \quad (28)$$

This resultant 510 (identifiable with the result 303 of FIG. 3B) of the over-based blend 'dodge' operation can be considered to be a Second Intermediate Result, stored in the Current Background.

At this point it can be seen that the contents 510 of the Current Background differ from the contents 509 of the Object A Contribution Buffer. The contents 509 of the Object A Contribution Buffer only include those portions of the grey triangle 507 that overlap Object A 506.

Finally, in step 505 (a special case of step 405), the opacity and colour of the First Intermediate Result 509 (result in Object A Contribution Buffer) is subtracted from the opacity and colour values of the Second Intermediate Result 510 (stored in the Current Background) to produce the result 511 (stored in the Current Background). In the example the result 511 (identifiable with the result 305 of FIG. 3C) is a grey triangle having a radial blend in a region near the right-hand vertex of the triangle. The result of step 505 is:

$$C_{result}\alpha_{result} = C_{over\text{-}blend}\alpha_{over\text{-}blend} - C_{src\text{-}out}\alpha_{src\text{-}out} \quad (29)$$

Substitute in $C_{over\text{-}blend}\alpha_{over\text{-}blend}$ (over-based blending operation) and $C_{src\text{-}out}\alpha_{src\text{-}out}$ (src-out Porter and Duff operator):

$$= C_A\alpha_A(1-\alpha_B) + C_B\alpha_B(1-\alpha_A) + B(C_A,C_B)\alpha_A\alpha_B - [C_A\alpha_A(1-\alpha_B)]$$

$$= C_A\alpha_A - C_A\alpha_A\alpha_B + C_B\alpha_B - C_B\alpha_B\alpha_A + B(C_A,C_B)\alpha_A\alpha_B - C_A\alpha_A + C_A\alpha_A\alpha_B$$

$$= C_B\alpha_B - C_B\alpha_B\alpha_A + B(C_A,C_B)\alpha_A\alpha_B$$

$$= C_B\alpha_B(1-\alpha_A) + B(C_A,C_B)\alpha_A\alpha_B$$

$$= C_{atop\text{-}blend}\alpha_{atop\text{-}blend} \quad (30)$$

and $$\alpha_{result} = \alpha_{over\text{-}blend} - \alpha_{src\text{-}out} \quad (31)$$

Substitute in $\alpha_{over\text{-}blend}$ and $\alpha_{src\text{-}out}$ equations $$= \alpha_A(1-\alpha_B) + \alpha_B(1-\alpha_A) + \alpha_A\alpha_B - [\alpha_A(1-\alpha_B)]$$

$$= \alpha_A - \alpha_A\alpha_B + \alpha_B - \alpha_A\alpha_B + \alpha_A\alpha_B - \alpha_A + \alpha_A\alpha_B$$

$$= \alpha_B$$

$$= \alpha_{atop\text{-}blend} \quad (32)$$

Thus the final result produced by the first arrangement is identical to the result of the atop-based 'dodge' blend operation.

Figure 21:
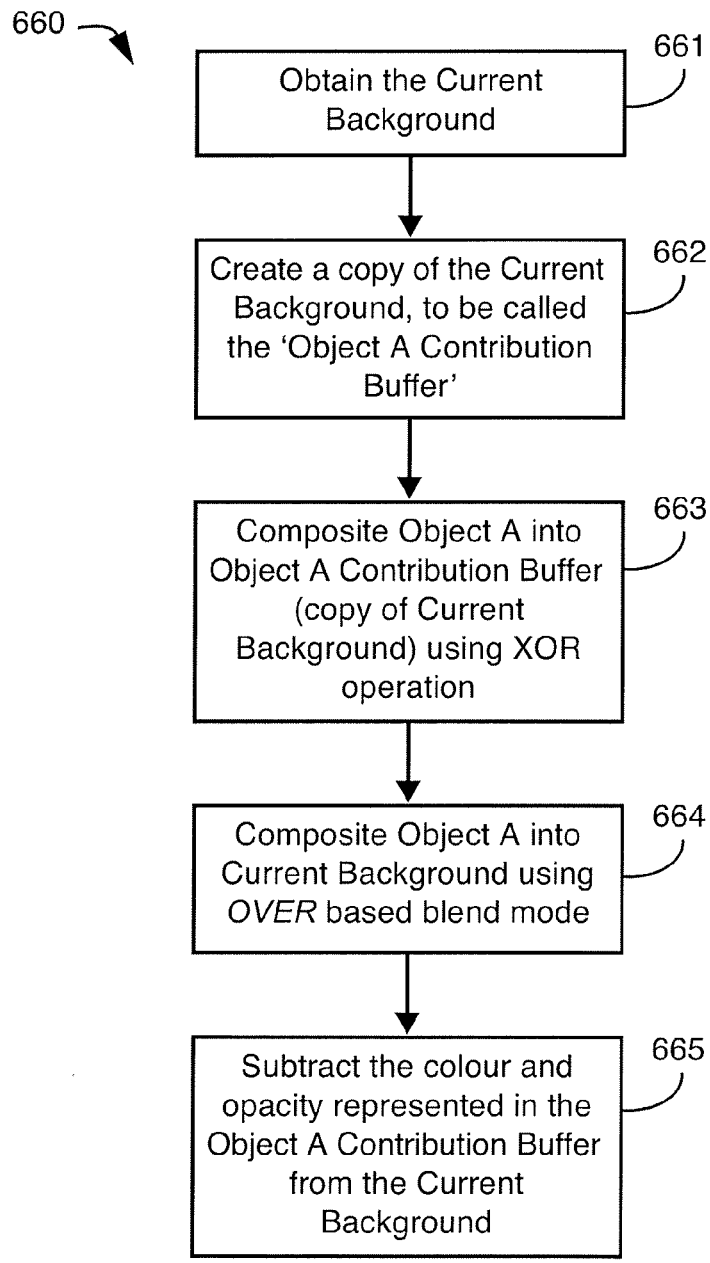
FIG. 21 is a flow chart representing a method in which the Foreground Correction Method of FIG. 19 is particularised to produce an in-based blending operation result.

In a second arrangement, the Foreground Correction Method 400 corrects the resultant of compositing an over-based blending operation to produce the effects of an in-based blending operation. FIG. 21 shows a schematic flow diagram representing a method 660 in which the generalised Foreground Correction Method 400 is particularised to produce an in-based 'dodge' blending result.

As in the method 400 of FIG. 19, Object A represents the desired graphic object to composite with previously composited objects. Object A will contain colour and opacity values. Object B represents the Current Background. The Current Background may be empty (i.e. blank), a subset of the previously composited objects, or all of the previously composited objects. In each case the Current Background will have colour and opacity values.

In step 661 the Current Background (Object B) is obtained. Obtaining the Current Background may involve retrieving or calculating the in-memory representation of either a subset or all of the previously rendered objects. The Current Background (Object B) will be known as a First Graphic Element containing colour and opacity. Similarly Object A will be known as a Second Graphic Element containing colour and opacity values.

In step 662 a copy of the Current Background is made prior to any blending operations. The copy of the Current Background is stored in the Object A Contribution Buffer.

In step 663 the Second Graphic Element (Object A) is composited into the Object A Contribution Buffer using the Porter and Duff xor operator:

$$C_{xor}\alpha_{xor} = C_A\alpha_A(1-\alpha_B) + C_B\alpha_B(1-\alpha_A) \quad (33)$$

$$\alpha_{xor} = \alpha_A + \alpha_B - 2\alpha_A\alpha_B \quad (34)$$

where:
$C_{xor}$=resultant colour of xor Porter and Duff operator; and
$\alpha_{xor}$=resultant opacity of xor Porter and Duff operator.

This resultant can be considered to be a First Intermediate Result. The Second Graphic Element (Object A) is then further composited, in step 664, with the First Graphic Element using an over-based blending operation 664. The result is stored in the Current Background. In this arrangement a 'dodge' function will be used in the blend operation:

$$C_{over\text{-}blend}\alpha_{over\text{-}blend} = C_A\alpha_A(1-\alpha_B) + C_B\alpha_B(1-\alpha_A) + B(C_A,C_B)\alpha_A\alpha_B \quad (35)$$

$$\alpha_{over\text{-}blend} = \alpha_A(1-\alpha_B) + \alpha_B(1-\alpha_A) + \alpha_A\alpha_B \quad (36)$$

where (for a 'dodge' operation) $B(C_A, C_B)$ is defined as:
if $(C_A+C_B) >= 1$ $$B(C_A,C_B) = 1 \quad (37)$$

else $$B(C_A,C_B) = C_B \cdot 1/(1-C_A) \quad (38)$$

This resultant of the over-based blend 'dodge' operation can be considered to be a Second Intermediate Result.

Finally, in step 665, the opacity and colour of the First Intermediate Result (result in Object A Contribution Buffer) is subtracted from the opacity and colour values of the Second Intermediate Result (Current Background result)

$$C_{result}\alpha_{result} = C_{over\text{-}blend}\alpha_{over\text{-}blend} - C_{xor}\alpha_{xor} \quad (39)$$

Substitute in $C_{over\text{-}blend}\alpha_{over\text{-}blend}$ (over-based blending operation) and $C_{xor}\alpha_{xor}$ (xor Porter and Duff operator)

$$= C_A\alpha_A(1-\alpha_B) + C_B\alpha_B(1-\alpha_A) + B(C_A,C_B)\alpha_A\alpha_B - [C_A\alpha_A(1-\alpha_B) + C_B\alpha_B(1-\alpha_A)]$$

$$= C_A\alpha_A(1-\alpha_B) + C_B\alpha_B(1-\alpha_A) + B(C_A,C_B)\alpha_A\alpha_B - C_A\alpha_A(1-\alpha_B) - C_B\alpha_B(1-\alpha_A)$$

$$= B(C_A,C_B)\alpha_A\alpha_B$$

$$= C_{in\text{-}blend}\alpha_{in\text{-}blend} \quad (40)$$

and $$\alpha_{result} = \alpha_{over\text{-}blend} - \alpha_{xor} \quad (41)$$

Substitute in $\alpha_{over\text{-}blend}$ and $\alpha_{xor}$ equations $$= \alpha_A(1-\alpha_B) + \alpha_B(1-\alpha_A) + \alpha_A\alpha_B - [\alpha_A+\alpha_B-2\alpha_A\alpha_B]$$

$$= \alpha_A - \alpha_A\alpha_B + \alpha_B - \alpha_A\alpha_B + \alpha_A\alpha_B - \alpha_A - \alpha_B + 2\alpha_A\alpha_B$$

$$= \alpha_A\alpha_B$$

$$= \alpha_{in\text{-}blend} \quad (42)$$

Thus the result of the step 665 is identical to the result that would have been obtained using the in-based 'dodge' blend operation. Thus, the second arrangement may be used to obtain the effect of an in-based blend, even though the only available blend operation is over-based.

Figure 22:
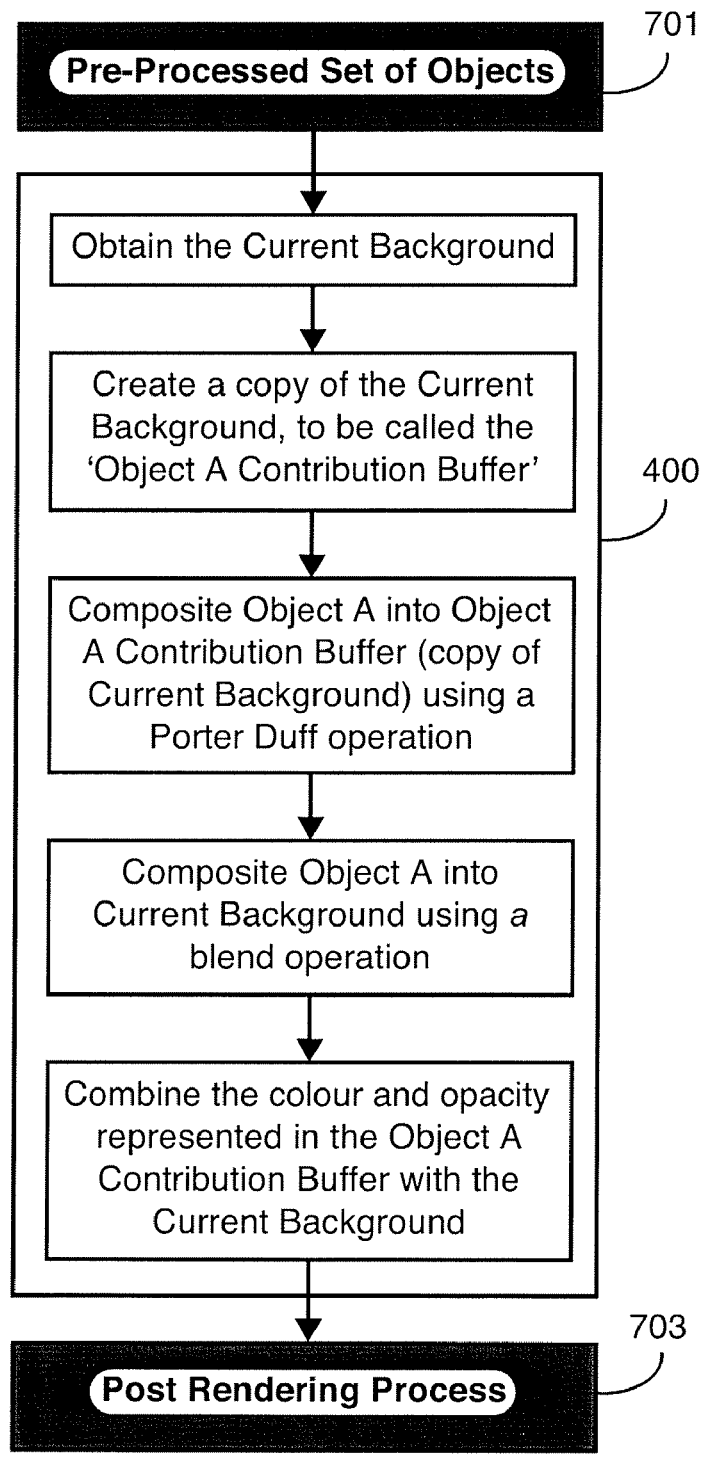
FIG. 22 shows the steps of the Foreground Correction Method of FIG. 19 used within a background group operation.

The Foreground Correction Method 400 is used to derive a final blending result from an initial blending result. Effectively the Foreground Correction Method 400 can replace Porter and Duff based blending operations that are part of a rendering procedure. An example of such a case is illustrated in FIG. 22. In this particular example a group of objects is copied from a pre-processed set of objects 701. Another object, (Object A) is then blended with the group. In some cases Object A would be blended with a Porter and Duff-based blending operation.

If the desired Porter and Duff based blending operation is unavailable to the graphics or rendering system, the Foreground Correction Method 400 can be used. The Foreground Correction Method 400 is used to blend the group of objects 701 (Current Background) and Object A to produce the desired effect. From this point the graphics or rendering system could continue with the remaining rendering process 703.

As demonstrated in FIGS. 20 and 21 the Foreground Correction Method 400 can be used to derive a desired effect from an initial Porter and Duff based blending result. This method 400 allows a graphics or rendering system that contains only one Porter and Duff based blending operation to extend the number of effects that can be produced. Examples of different arrangements of the Foreground Correction Method 400 are shown in the following table:

TABLE 2

Different arrangements of the Foreground Correction Method.

| Step 404 Base Blending Operation | Step 403 Porter and Duff Operator | Step 405 Combination | Resulting blend operation Effect |
| --- | --- | --- | --- |
| src-over | src-out | subtract | src-atop |
| src-over | xor | subtract | src-in |
| src-atop | src-out | add | src-over |
| src-atop | dst-out | subtract | src-in |
| src-in | xor | add | src-over |
| src-in | dst-out | add | src-atop |

The first row of Table 2 corresponds to the first arrangement, in which the effect of an atop-based blend is obtained using an over-based blend. The second row of Table 2 corresponds to the second arrangement, in which the effect of an in-based blend is obtained using an over-based blend.

The following four rows of Table 2 summarise further arrangements of method 400. The first column of Table 2 shows the blending operation used in step 404, i.e. a blending operation that is actually available in the rendering system. The second column of Table 2 shows the Porter and Duff operator that is used in step 403 in each of the arrangements. The third column of Table 2 shows the combining operation used in each of the arrangements. The final column shows the blend operation of which the effect is reproduced in the corresponding arrangement.

INDUSTRIAL APPLICABILITY

It is apparent from the above that the disclosed methods are applicable to the data processing industries.

The foregoing describes only some embodiments of the present invention, and modifications and/or changes can be made thereto without departing from the scope of the invention, the embodiment(s) being illustrative and not restrictive. The disclosure is presented primarily in terms of a printer engine. However, the disclosed arrangements may be used in any system that requires a renderer.

We claim:

1. A method of compositing graphic elements, the method being performed in a pixel-based renderer, said method comprising the steps of:
   receiving by the renderer a first graphic element having a first colour and a first opacity and a second graphic element having a second colour and a second opacity;
   determining by the renderer a blend output of a blend function dependent on the first colour and the second colour, wherein the blend function uses the second colour to modify the first colour to determine the blend output; and
   determining by the renderer a resultant colour and a resultant opacity of a compositing operation on the first and second graphic elements, the resultant opacity being equal to the first opacity and the resultant colour having contributions from the first colour and the second colour while being dependent only on the blend output to provide the contribution of the second colour, the resultant colour also being independent of the first opacity.

2. A method according to claim 1 comprising the further step of determining a resultant opacity of the compositing operation, the resultant opacity being equal to the first opacity.

3. A method according to claim 1 comprising the further step of determining a resultant opacity of the compositing operation, the resultant opacity being equal to a product of the first opacity and the second opacity.

4. A method according to claim 1 wherein the compositing operation is a modified atop operation.

5. A method according to claim 1 wherein the compositing operation is a modified in operation.

6. The method according to claim 1, wherein the output of the blend function is independent of the first opacity and the resultant colour is independent of the first opacity.

7. The method according to claim 1, wherein said determining step comprises the sub-steps of:
   compositing the first graphic element with the second graphic element using a first operator to produce a first intermediate result;
   compositing the first graphic element with the second graphic element using a second blend operation that is different to the blend operation to produce a second intermediate result, said second blend operation using said blend output; and
   combining the first intermediate result with the second intermediate result to produce said resultant colour.

8. A method of compositing graphic elements according to a blend operation, the method being performed by a pixel-based renderer, said method comprising the steps of:
   receiving by the renderer a first graphic element having a first colour and a first opacity and a second graphic element having a second colour and a second opacity;
   determining by the renderer a blend output of a blend function, that operates on the first and second colours independent of their respective opacities and a compositing operator to produce a resultant colour, wherein the blend function uses the second colour to modify the first colour to determine the blend output; and
   determining by the renderer a resultant colour and a resultant opacity of the compositing operation on the first and second graphic elements, the resultant opacity being equal to the first opacity and the resultant colour having contributions from the first colour and the second colour while being dependent only on the blend output to provide the contribution of the second colour, the resultant colour also being independent of the first opacity.

9. A method according to claim 8, said method comprising the steps of:
compositing the first graphic element with the second graphic element using a first operator to produce a first intermediate result;
compositing the first graphic element with the second graphic element using a second blend operation that is different to the blend operation to produce a second intermediate result; and
combining the first intermediate result with the second intermediate result to produce said resultant colour.

10. A method according to claim 9 wherein the blend operation and the second blend operation both include said blend function.

11. A method according to claim 9 wherein the blend operation is based on an atop operation and the second blend operation is based on an over operation.

12. A method according to claim 11 wherein the first operator is a src-out operator and said combining step subtracts the first intermediate result from the second intermediate result.

13. A method according to claim 9 wherein the blend operation is based on an in operation and the second blend operation is based on an over operation.

14. A method according to claim 13 wherein the first operator is a xor operator and said combining step subtracts the first intermediate result from the second intermediate result.

15. A method according to claim 9 wherein the blend operation is based on an over operation and the second blend operation is based on an atop operation.

16. A method according to claim 15 wherein the first operator is a src-out operator and said combining step adds the first intermediate result to the second intermediate result.

17. A method according to claim 9 wherein the blend operation is based on an in operation and the second blend operation is based on an atop operation.

18. A method according to claim 17 wherein the first operator is a dst-out operator and said combining step subtracts the first intermediate result from the second intermediate result.

19. A method according to claim 9 wherein the blend operation is based on an over operation and the second blend operation is based on an in operation.

20. A method according to claim 19 wherein the first operator is a xor operator and said combining step adds the first intermediate result to the second intermediate result.

21. A method according to claim 9 wherein the blend operation is based on an atop operation and the second blend operation is based on an in operation.

22. A method according to claim 21 wherein the first operator is a dst-out operator and said combining step adds the first intermediate result to the second intermediate result.

23. The method according to claim 8, wherein the compositing operator is a modified atop operator.

24. The method according to claim 23, wherein the pixel-based renderer comprises a pixel sequential rendering system, and the method is implemented by setting flags to indicate that regions of interest for the compositing are 'source intersect destination' and 'destination outside source' and wherein an independent operation code specifies the blend function.

25. The method according to claim 23, wherein the pixel-based renderer comprises a framestore rendering system, and the method is implemented whereby the first and second graphic elements are combined such that the resultant colour is the sum of two terms, the first term being a product of the second opacity and a result of the blend function, the second term being a product of the complement of the second opacity and the first colour, and wherein the resultant opacity is equal to the first opacity.

26. The method according to claim 4 or claim 23, wherein the atop operator is modified such that the colour in the region where both objects are opaque is given by the blend output.

27. The method according to claim 8, wherein the compositing operator is a modified in operator.

28. The method according to claim 27, wherein the pixel-based renderer comprises a pixel sequential rendering system, and the method is implemented by setting flags to indicate that a region of interest for the compositing is 'source intersect destination' and wherein an independent operation code specifies the blend function.

29. The method according to claim 27, wherein the pixel-based renderer comprises a framestore rendering system, and the method is implemented whereby the first and second graphic elements are combined such that the resultant colour is a result of the blending function, and wherein the resultant opacity is equal to the product of the first and second opacities.

30. The method according to claim 5 or claim 27, wherein the in operator is modified such that the colour in the region where both objects are opaque is given by the blend output.

31. An apparatus for compositing graphic elements in a pixel-based renderer, said apparatus comprising:
means for receiving a first graphic element having a first colour and a first opacity and a second graphic element having a second colour and a second opacity;
means for determining a blend output of a blend function dependent on the first colour and the second colour, wherein the blend function uses the second colour to modify the first colour to determine the blend output; and
means for determining a resultant colour and a resultant opacity of a compositing operation on the first and second graphic elements, the resultant opacity being equal to the first opacity and the resultant colour having contributions from the first colour and the second colour while being dependent only on the blend output to provide the contribution of the second colour, the resultant colour also being independent of the first opacity.

32. A computer program product comprising machine-readable program code recorded on a machine-readable recording medium, for controlling the operation of a data processing apparatus on which the program code executes to perform a method of compositing graphic elements in a pixel-based renderer, said method comprising the steps of:
receiving a first graphic element having a first colour and a first opacity and a second graphic element having a second colour and a second opacity;
determining a blend output of a blend function dependent on the first colour and the second colour, wherein the blend function uses the second colour to modify the first colour to determine the blend output; and
determining a resultant colour and a resultant opacity of a compositing operation on the first and second graphic elements, the resultant opacity being equal to the first opacity and the resultant colour having contributions from the first colour and the second colour while being dependent only on the blend output to provide the contribution of the second colour, the resultant colour also being independent of the first opacity.

* * * * *